US012719075B2

United States Patent

(12) United States Patent
Nuckolls et al.

(10) Patent No.: US 12,719,075 B2
(45) Date of Patent: Aug. 25, 2026

(54) REDOX FLOW BATTERIES AND COMPOUNDS FOR BATTERY APPLICATION

(71) Applicant: THE TRUSTEES OF COLUMBIA UNIVERSITY IN THE CITY OF NEW YORK, New York, NY (US)

(72) Inventors: Colin Nuckolls, New York, NY (US); Raul Hernandez Sanchez, New York, NY (US); Yuan Yang, New York, NY (US); Thomas Sisto, Dover, MA (US); Margarita Milton, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 688 days.

(21) Appl. No.: 17/673,679

(22) Filed: Feb. 16, 2022

(65) Prior Publication Data

US 2022/0255106 A1 Aug. 11, 2022

Related U.S. Application Data

(60) Division of application No. 16/792,501, filed on Feb. 17, 2020, now Pat. No. 11,289,729, which is a continuation of application No. PCT/US2018/046926, filed on Aug. 17, 2018.

(60) Provisional application No. 62/574,590, filed on Oct. 19, 2017, provisional application No. 62/546,967, filed on Aug. 17, 2017.

(51) Int. Cl.
*H01M 8/20* (2006.01)
*H01M 8/2435* (2016.01)

(52) U.S. Cl.
CPC .......... *H01M 8/20* (2013.01); *H01M 8/2435* (2013.01)

(58) Field of Classification Search
CPC . H01M 8/18–188; H01M 8/20; H01M 8/2435
See application file for complete search history.

(56) References Cited

U.S. PATENT DOCUMENTS

| | | | |
|---|---|---|---|
| 5,446,134 | A | 8/1995 | Armand et al. |
| 9,257,714 | B2 | 2/2016 | Park et al. |
| 9,300,000 | B2 | 3/2016 | Jansen et al. |
| 9,614,245 | B2 | 4/2017 | Narayan et al. |
| 9,647,290 | B2 | 5/2017 | Sekine et al. |
| 9,673,473 | B2 | 6/2017 | Park et al. |

(Continued)

FOREIGN PATENT DOCUMENTS

| | | | |
|---|---|---|---|
| AU | 2018317463 | B2 | 4/2023 |
| CA | 3072605 | A1 | 2/2019 |

(Continued)

OTHER PUBLICATIONS

Machine Translation of JP-2009290116-A (Jan. 22, 2025) (Year: 2025).*

(Continued)

*Primary Examiner* — Matthew J Merkling
(74) *Attorney, Agent, or Firm* — KPPB LLP

(57) ABSTRACT

The present disclosure relates to organic electrolyte solutions including organic electrolytes (e.g., aromatic imides, ferrocenes, spiro fused compounds, or cyclopropenium compounds), and redox flow batteries and systems including the same.

15 Claims, 34 Drawing Sheets

Dimethylpiperidine Cyclopropenium

(56) References Cited

U.S. PATENT DOCUMENTS

| | | | | |
|---|---|---|---|---|
| 9,680,193 | B2 | 6/2017 | Amendola et al. | |
| 9,685,674 | B2 | 6/2017 | Izuhara et al. | |
| 9,692,061 | B2 | 6/2017 | Oh et al. | |
| 11,289,729 | B2 | 3/2022 | Nuckolls et al. | |
| 2002/0009635 | A1 | 1/2002 | Michot et al. | |
| 2009/0011743 | A1 | 1/2009 | Johanson et al. | |
| 2009/0068529 | A1 | 3/2009 | Martin et al. | |
| 2009/0117438 | A1 | 5/2009 | Saito et al. | |
| 2011/0101276 | A1 | 5/2011 | Rybtchinski et al. | |
| 2012/0141889 | A1* | 6/2012 | Lee | H01M 12/06 429/405 |
| 2013/0273459 | A1* | 10/2013 | Xu | H01M 8/188 429/498 |
| 2014/0141291 | A1* | 5/2014 | Wang | H01M 4/405 429/105 |
| 2014/0178735 | A1* | 6/2014 | Wang | H01M 8/20 429/105 |
| 2014/0370403 | A1 | 12/2014 | Narayan et al. | |
| 2015/0263371 | A1 | 9/2015 | Stahl et al. | |
| 2017/0117588 | A1 | 4/2017 | Fujita et al. | |
| 2017/0222226 | A1* | 8/2017 | Helms | C07D 209/58 |
| 2017/0346104 | A1* | 11/2017 | Helms | H01M 8/188 |
| 2018/0072669 | A1* | 3/2018 | Liu | H01M 8/188 |
| 2018/0191012 | A1* | 7/2018 | Zhang | H01M 8/188 |
| 2018/0337419 | A1* | 11/2018 | Small | H01M 8/1016 |
| 2019/0006712 | A1* | 1/2019 | Zhang | H01M 10/0525 |
| 2019/0047880 | A1* | 2/2019 | Desai | H01M 4/42 |
| 2020/0028172 | A1* | 1/2020 | Deschamps | H01M 4/624 |
| 2020/0259199 | A1 | 8/2020 | Nuckolls et al. | |
| 2020/0373599 | A1 | 11/2020 | Gordon et al. | |
| 2022/0363663 | A1 | 11/2022 | Feng et al. | |
| 2024/0304840 | A1 | 9/2024 | Sisto et al. | |
| 2024/0332585 | A1 | 10/2024 | Sisto et al. | |
| 2025/0163089 | A1 | 5/2025 | Evans et al. | |

FOREIGN PATENT DOCUMENTS

| | | | | |
|---|---|---|---|---|
| CA | 3072605 | C | 12/2023 | |
| CN | 106549178 | A | 3/2017 | |
| CN | 111066109 | A | 4/2020 | |
| CN | 121420381 | A | 1/2026 | |
| EP | 3131153 | A1 | 2/2017 | |
| EP | 3669390 | A1 | 6/2020 | |
| EP | 3669390 | B1 | 5/2025 | |
| EP | 4629397 | A2 | 10/2025 | |
| EP | 4629397 | A3 | 12/2025 | |
| EP | 4677664 | A1 | 1/2026 | |
| EP | 4677671 | A2 | 1/2026 | |
| HK | 40029510 | | 2/2021 | |
| IL | 272602 | A | 3/2020 | |
| IL | 307149 | B1 | 2/2025 | |
| IN | 540019 | | 5/2024 | |
| JP | 2006172817 | A | 6/2006 | |
| JP | 2009290116 | A * | 12/2009 | B60L 50/64 |
| JP | 2010541126 | A | 12/2010 | |
| JP | 2020532052 | A | 11/2020 | |
| JP | 7245228 | B2 | 3/2023 | |
| KR | 20130083643 | A | 7/2013 | |
| KR | 20130116022 | A | 10/2013 | |
| KR | 20140077617 | A | 6/2014 | |
| KR | 20200041321 | A | 4/2020 | |
| KR | 102885319 | B1 | 11/2025 | |
| MX | 2020001819 | A | 10/2020 | |
| MX | 427366 | | 9/2025 | |
| WO | 2009118742 | A1 | 10/2009 | |
| WO | 2012117594 | | 9/2012 | |
| WO | 2012117594 | A1 | 9/2012 | |
| WO | WO-2015120971 | A1 * | 8/2015 | H01M 4/368 |
| WO | 2016025467 | A1 | 2/2016 | |
| WO | 2016186083 | | 11/2016 | |
| WO | 2016186083 | A1 | 11/2016 | |
| WO | 2017083439 | | 5/2017 | |
| WO | 2017083439 | A1 | 5/2017 | |
| WO | 2019036633 | A1 | 2/2019 | |
| WO | 2021209585 | A1 | 10/2021 | |
| WO | 2024186684 | A1 | 9/2024 | |
| WO | 2024196570 | A2 | 9/2024 | |
| WO | 2024196570 | A3 | 12/2024 | |
| WO | 2025106995 | A1 | 5/2025 | |

OTHER PUBLICATIONS

Hernandez et al., "Perylene Polyimide-Polyether Anodes for Aqueous All-Organic Polymer Batteries," ACS Appl. Energy Mater. 2018, 1, 7199?7205.

Singh et al., "Aqueous organic redox flow batteries," Nano Res. 2019, 12(9): 1988-2001.

Sun et al., "Water-soluble perylenediimides: design concepts and biological applications," Chem. Soc. Rev., 2016, 45, 1513.

International Search Report and Written Opinion for International Application No. PCT/US2018/046926, Search completed Oct. 8, 2018, Mailed Dec. 4, 2018, 22 Pgs.

Brushett et al., "An All-Organic Non-aqueous Lithium-Ion Redox Flow Battery", Adv. Energy Mater., 2012, vol. 2, pp. 1390-1396.

Doris et al., "Macromolecular Design Strategies for Preventing Active-Material Crossover in Non-Aqueous All-Drganic Redox-Flow Batteries", Angewandte Chemie 2017, vol. 56, Issue 6, pp. 1595-1599.

Huskinson et al., "A metal-free organic-inorganic aqueous flow battery", Nature vol. 505, pp. 195-198 (2014).

Hwang et al., "Ferrocene and Cobaltocene Derivatives for Non-Aqueous Redox Flow Batteries", ChemSusChem; Nov. 26, 2014, vol. 8, Issue 2, pp. 310-314; abstract; p. 311.

Iordache et al., "Perylene-Based All-Organic Redox Battery with Excellent Cycling Stability", ACS Applied Materials & Interfaces; Aug. 24, 2016, vol. 8, Issue 35, pp. 22762-22767; abstract; p. 22765, XP055570941, DOI:10.1021/acsami.6b07591.

Milton et al., "Molecular Materials for Nonaqueous Flow Batteries with a High Coulombic Efficiency and Stable Cycling", Nano Letters; Nov. 10, 2017, vol. 17, Issue 2, pp. 7859-7863; entire document.

Montoto et al., "Redox Active Polymers for Non-Aqueous Redox Flow Batteries: Validation of the Size-Exclusion Approach", Journal of The Electrochemical Society, 164 (7) A1688-A1694 (2017).

Schuster et al., "Electron Delocalization in Perylene Diimide Helicenes", Angewandte Chemie International Edition; Oct. 17, 2016, vol. 55, Issue 43, pp. 13519-13523; abstract; figure 1.

Sun et al., "Water-soluble perylenediimides: design concepts and biological applications", Chem. Soc. Rev. 2016, 45, 1513-1528.

Xu et al., "A Zeolite Ion Exchange Membrane for Redox Flow Batteries", Chemical Communications; Mar. 7, 2014, Issue 19, pp. 2416-2419; abstract; p. 2417; abstract; p. 2417, XP055570982, DOI: 10.1039/C3CC47214K.

Yang et al., "An Inexpensive Aqueous Flow Battery for Large-Scale Electrical Energy Storage Based on Water-Soluble Organic Redox Couples", Journal of The Electrochemical Society, 161 (9) A1371-A1380 (2014).

Yang et al., "Electrochemical Energy Storage for Green Grid", Chem. Rev. 2011, 111, 5, 3577-3613.

Yu et al., "A Membrane-Free Ferrocene-Based High-Rate Semiliquid Battery", Nano Lett. 2015, 15, 6, 4108-4113.

Zhong et al., "Efficient Organic Solar Cells with Helical Perylene Diimide Electron Acceptors", Journal of the American Chemical Society; Dec. 13, 2017, vol. 136, Issue 43, pp. 15215-15221; abstract; figure 1a.

Brushett et al., "An All-Organic Non-aqueous Lithium-Ion Redox Flow Battery," Advanced Energy Materials 2012, vol. 2, Issue 11, pp. 1390-1396.

Doris et al., "Macromolecular Design Strategies for Preventing Active-Material Crossover in Non-Aqueous All-Organic Redox-Flow Batteries," Angewandte Chemie 2017, vol. 56, Issue 6, pp. 1595-1599.

Hwang et al., "Ferrocene and Cobaltocene Derivatives for Non-Aqueous Redox Flow Batteries," ChemSusChem 2015, 8, 310-314.

(56) References Cited

OTHER PUBLICATIONS

Lordache et al., "Perylene-Based All-Organic Redox Battery with Excellent Cucling Stability," ACS Appl. Mater. Interfaces 2016, 8, 22762-22767.
Xu et al., "A Zeolite Ion Exchange Membrane fro Redox Flow Batteries," Chem. Commun., 2014, 50, 2416-2419.
International Search Report dated Dec. 4, 2018 relating to International Application No. PCT/US2018/046926.
Hwang, Bet al., 'Ferrocene and Cobaltocene Derivatives for Non-Aqueous Redox Flow Batteries'; Nov. 26, 2014, ChemSusChem; vol. 8, Issue 2, pp. 310-314.
Iordache, A et al., 'Perylene-Based All-Organic Redox Battery with Excellent Cycling Stability'; Aug. 12, 2016, ACS Applied Materials & Interfaces; vol. 8, Issue 35, pp. 22762-22767.
Milton, Met al., 'Molecular Materials for Nonaqueous Flow Batteries with a High Coulombic Efficiency and Stable Cycling'; Nov. 10, 2017, Nano Letters; vol. 17, Issue 2, pp. 7859-7863.
Schuster, N.J. et al. 'Electron Delocalization in Perylene Diimide Helicenes'; Oct. 17, 2016, Angewandte Chemie International Edition; vol. 55, Issue 43, pp. 13519-13523.
Xu, X et al.) 'A zeolite ion exchange membrane for redox flow batteries'; Mar. 7, 2014, Chemical Communications; Issue 19, pp. 2416-2419.
Zhong, Yet al., 'Efficient Organic Solar Cells with Helical Perylene Diimide Electron Acceptors'; Dec. 13, 2017, Journal of the American Chemical Society; vol. 136, Issue 43, pp. 15215-15221.
Extended European Search Report for European Application No. 18845631.3, Search completed Mar. 25, 2021, Mailed Apr. 6, 2021, 9 Pgs.
International Search Report and Written Opinion for International Application No. PCT/US2024/056424, Search completed Feb. 22, 2025, Mailed Mar. 3, 2025, 15 Pgs.
International Search Report and Written Opinion for International Application No. PCT/US2024/018226, Search completed May 7, 2024, Mailed Jun. 26, 2024, 16 Pgs.
International Search Report and Written Opinion for International Application No. PCT/US2024/018221, Search completed Sep. 6, 2024, Mailed Nov. 5, 2024, 14 Pgs.
Abraham et al., "Reactivities of Carboxyalkyl-Substituted 1,4,5,8-Naphthalene Diimides in Aqueous Solution", J. Am. Chem. Soc. 2004, 126, 13, 4293-4300.
Hu et al., "Long-Cycling Aqueous Organic Redox Flow Battery (AORFB) toward Sustainable and Safe Energy Storage", Journal of American Chemical Society, Dec. 14, 2016, vol. 139, pp. 1207-1214.
Liu et al., "Arylene Diimide Derivatives as Anolyte Materials with Two-Electron Storage for Ultrastable Neutral Aqueous Organic Redox Flow Batteries", CCS Chemistry. Dec. 22, 2022, vol. 5, p. 2334-2347.
Liu et al., "Corrosion behavior of a bipolar plate of carbon-polyethylene composite in a vanadium redox flow battery", RSC Advances 2015, 5 (8), 5928-5932.
Extended European Search Report for European Application No. 25178627.3, Search completed Oct. 28, 2025, Mailed Nov. 5, 2025, 08 Pgs.
International Preliminary Report on Patentability for International Application PCT/US2024/018221, Report issued Sep. 9, 2025, Mailed Sep. 18, 2025, 8 Pgs.
International Preliminary Report on Patentability for International Application PCT/US2024/018226, Report issued Sep. 9, 2025, Mailed Sep. 18, 2025, 9 Pgs.

* cited by examiner $[PDI]^{2+}$ $[Fc_4]$

S1

S2

[Fc4]

S3

S4

S5

[PDI][TFSI]2

[PDI][TFSI]2

[Fc4]

[Fc4]

[PDI][TFSI]$_2$

[PDI][TFSI]$_2$

[PDI][TFSI]$_2$

[$Fc_4$]

Coulombic Efficiency > 99.95%
Capacity Retention = 99.954% per cycle

Four redox events

- First two are ~0.85 V more than PDI
- Second two are ~0.5 V more negative than first (irreversible)

Dimethylpiperidine
Cyclopropenium 3 months
out of glovebox – red means
charged (acetonitrile)

NDI – Napthalene Diimide

The supporting electrolyte is LiTFSI

The supporting electrolyte is Tetrabutyl Ammonium TFSI

Voltage Profile with Tetrabutyl Ammonium Salt
(Cycle 20)

3.1
3
2.9
2.8
2.7
2.6
2.5

2.95 V recorded
open circuit voltage

REDOX FLOW BATTERIES AND COMPOUNDS FOR BATTERY APPLICATION

CROSS-REFERENCE TO RELATED APPLICATION

This application claims priority to U.S. Provisional Application Nos. 62/546,967 filed on Aug. 17, 2017, and 62/574,590 filed on Oct. 19, 2017, the contents of which are incorporated by reference in their entireties, and to which priority is claimed.

GRANT INFORMATION

This invention was made with government support under DMR-1420634 awarded by National Science Foundation (NSF). The government has certain rights in the invention.

BACKGROUND

The present disclosure relates to organic electrolyte solutions, redox flow batteries and systems including the same.

Certain types of renewable power generation, including solar and wind generation, can be intermittent. Due at least in part to the intermittency of these energy sources, efficient and durable energy storage devices are desirable to store power generated from such sources.

Redox flow batteries (RFBs) are an energy storage device suitable to store power generated from renewable sources. RFBs include batteries having storage electrolytes that can be dissolved in solvent, stored in tanks, and pumped through an electrochemical cell. In such batteries, the power and capacity can be decoupled and varied independently. For example, power can be selected by adjusting the cell stack, and storage capacity can be selected by adjusting the tank size.

However, there remains a need for techniques and systems for RFBs with improved stability and with characteristics suitable for storing power generated from renewable sources.

SUMMARY

The present disclosure provides organic electrolyte solutions including improved organic compounds, redox flow batteries and systems including the same.

In one aspect, the present disclosure provides an electrolyte solution including a solvent and an electrolyte that is an aromatic imide, ferrocene derivatives, cyclopropenium compounds, or combinations thereof, where the electrolyte is soluble in the solvent.

In certain embodiments, the aromatic imide is derivatives of perylene diimide (PDI), derivatives of naphthalene diimide, or combinations thereof.

In certain embodiments, the electrolyte is perylene diimide trifluoromethane sulfonimide ($[PDI][TFSI]_2$). In certain embodiments, the electrolyte is tetraferrocene ($[Fc_4]$). In certain embodiments, the cyclopropenium compound is dimethylpiperidine cyclopropenium.

In certain embodiments, the solvent is a non-aqueous solvent. In certain embodiments, the non-aqueous solvent is selected from dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, and N,N-dimethylacetamide.

In certain embodiments, the solvent is an aqueous solvent. In certain embodiments, the aqueous solvent includes water. In certain embodiments, the aqueous solvent further includes a salt selected from NaCl, KCl, MgCl2, CaCl2), and LiCl.

In another aspect, the present disclosure provides a redox flow battery including a cathode cell having a catholyte; and an anode cell having an anolyte, where at least one of the catholyte and the anolyte includes the organic electrolyte solution disclosure herein.

In certain embodiments, the anolyte includes a derivative of PDI, and the catholyte includes a ferrocene derivative. In certain embodiments, the anolyte includes $[PDI][TFSI]_2$, and the catholyte includes $[Fc_4]$. In certain embodiments, the anolyte includes $[PDI][TFSI]_2$, and the catholyte includes dimethylpiperidine cyclopropenium.

In certain embodiments, the redox flow battery further includes an electrode, which can be a carbon felt electrode. In certain embodiments, the electrode is a carbon paper electrode. In certain embodiments, the redox flow battery further includes a membrane as a separator disposed between the cathode cell and the anode cell. The membrane can be a dialysis and size exclusion membrane, a cellulous membrane, or an ion exchange membrane. In certain embodiments, the membrane is a membrane disclosed in U.S. Provisional Application No. 62/699,489 filed Jul. 17, 2018, the contents of which are incorporated by reference herein.

In certain embodiments, the redox flow battery further includes a supporting electrolyte. In certain embodiments, the supporting electrolyte is lithium hexafluorophosphate (LiPF6). In certain embodiments, the supporting electrolyte is lithium bistrifluoromethanesulfonimide.

In certain embodiments, the redox flow battery disclosed herein has a coulombic efficiency of about 99% at each cycle for over 50 charge and discharge cycles.

In yet another aspect, the present disclosure provides an organic compound for use in a battery having a structure represented by the following formula (I):

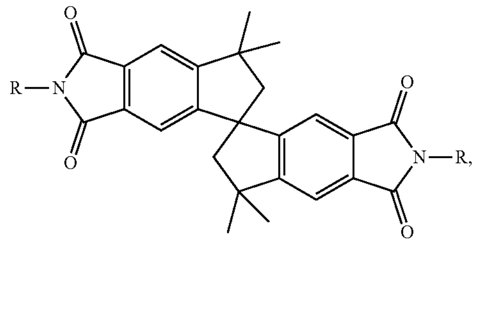

or a derivative thereof, wherein R represents alkyl, ether, ammonium salt, or any solubilizing chain.

In certain embodiments, the organic compound is a spiro-ethylphthalimide. In certain embodiments, the organic compound is a spiro-ethylcatechol.

In another aspect, the present disclosure provides to a redox flow battery including a spiro-fused organic compound having a structure represented by the following formula (I):

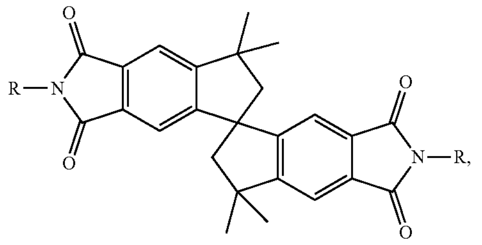

or a derivative thereof, wherein R represents alkyl, ether, ammonium salt, or any solubilizing chain. In certain embodiments, the organic compound is a spiro-ethylphthalimide or a spiro-ethylcatechol.

In certain embodiments, the redox flow battery further includes an anolyte. In certain embodiments, the anolyte is $[Fc_4]$. In certain embodiments, the catholyte is a cyclopropenium compound. In certain embodiments, the cyclopropenium compound is dimethylpiperidine cyclopropenium.

In certain embodiments, the redox flow battery further includes a membrane as a separator. In certain embodiments, the membrane is a Daramic 175. In certain embodiments, the membrane is an ion exchange membrane. In certain embodiments, the membrane is a membrane disclosed in U.S. Provisional Application No. 62/699,489.

In another aspect, the present disclosure provides an electricity storage system including a redox flow battery, wherein the redox flow battery includes a spiro-fused organic compound having a structure represented by the following formula (I):

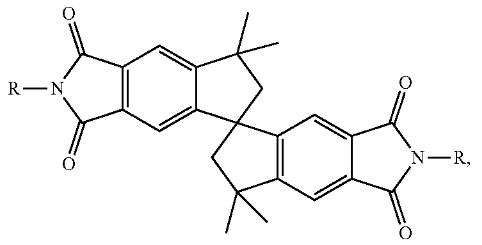

or a derivative thereof, wherein R represents alkyl, ether, ammonium salt, or any solubilizing chain.

DETAILED DESCRIPTION

The present disclosure provides organic electrolytes (e.g., aromatic imides, ferrocenes, spiro fused compounds, or cyclopropenium compounds) and redox flow batteries and systems including the same. In certain embodiments, the aromatic imides are perylene diimide trifluoromethane sulfonimide ($[PDI][TFSI]_2$) or naphthalene diimide, and their derivatives. The present disclosure further provides spiro-fused organic compounds for use in redox flow batteries.

In certain embodiments, the organic electrolytes disclosed herein can be used in aqueous redox flow batteries. Water can be desirable as a solvent due to its relatively low cost for use in battery systems. Thus, aqueous redox flow batteries can be suitable for use as industrial scale batteries, for example where space is not a concern (e.g., a grid-scale battery). In certain embodiments, the organic electrolytes disclosed herein can be used with non-aqueous redox flow batteries. The non-aqueous redox flow batteries can be used with larger voltage excursions (e.g., in excess of 3V and wider temperature ranges (−20 to 110° C.) compared to certain aqueous battery systems.

In one aspect, the present disclosure provides novel organic electrolytes for use in a redox flow battery. The organic electrolytes disclosed herein can provide stability for a long lifetime redox flow battery. As used herein, the term “long lifetime” refers to a battery having a stable capacity retention over repeated charge and discharge cycles. In certain embodiments, coulombic efficiency is used as an indicator for the capacity retention. In certain embodiments, a long lifetime battery refers to a battery where capacity retention is stable on the year timescale.

In certain embodiments, the present disclosure provides an electrolyte solution including a solvent, and an electrolyte. In certain embodiments, the electrolytes are synthetically modified to tune their electrochemical properties to achieve wide ranges of voltages. In certain embodiments, the electrolytes are designed and synthesized to have large hydrodynamic radii to preclude their ability to transverse the membrane.

Figure 1:
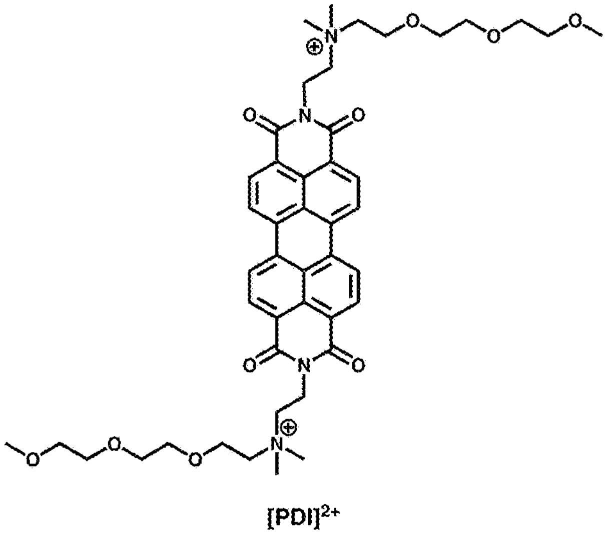
FIG. 1. Full molecular structure of $[PDI]^{2+}$ and $[Fc_4]$.
Figure 1:
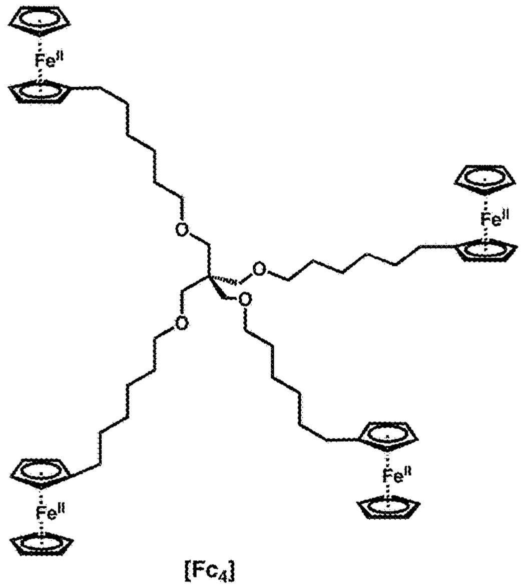

In certain embodiments, the electrolyte is an aromatic imide. In certain embodiments, the aromatic imide is a perylene diimide (PDI), or a naphthalene diimide, or a derivative thereof. In certain embodiments, the electrolyte is perylene diimide trifluoromethane sulfonimide ($[PDI][TFSI]_2$). In certain embodiments, the electrolyte is a ferrocene derivative. In certain embodiments, the ferrocene derivative is tetraferrocene $[Fc_4]$. Molecular structures of $[PDI][TFSI]_2$ and $[Fc_4]$ are shown in FIG. 1.

Figure 2:
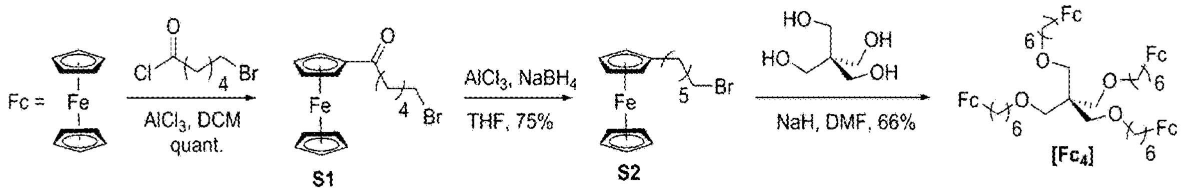
FIG. 2. Scheme S1: Synthesis of $[Fc_4]$.
Figure 3:
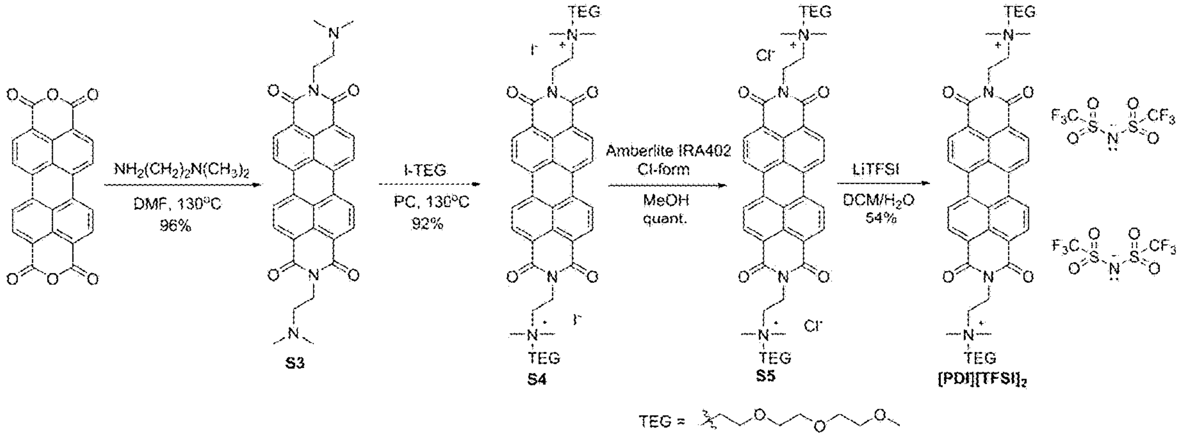
FIG. 3. Scheme S2: Synthesis of $[PDI][TFSI]_2$
Figure 3:
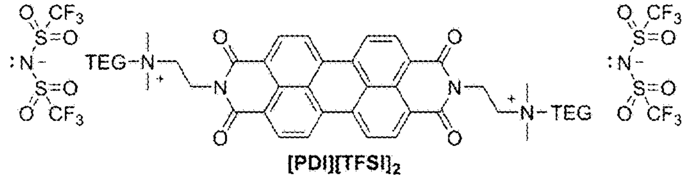
Figure 4:
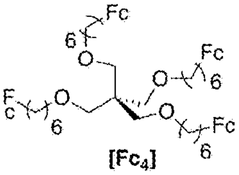
FIG. 4. $^1H$ NMR (upper panel) and $^{13}C$ NMR spectra (lower panel) of $[Fc_4]$.
Figure 4:
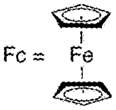
Figure 4:
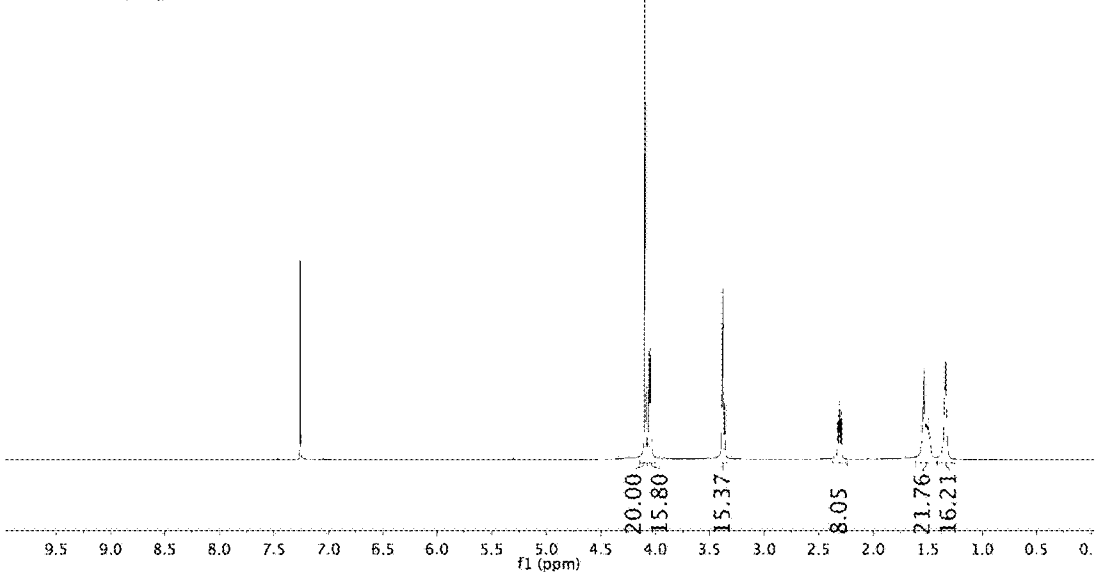
Figure 4:
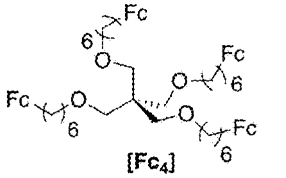
Figure 4:
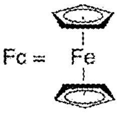
Figure 4:
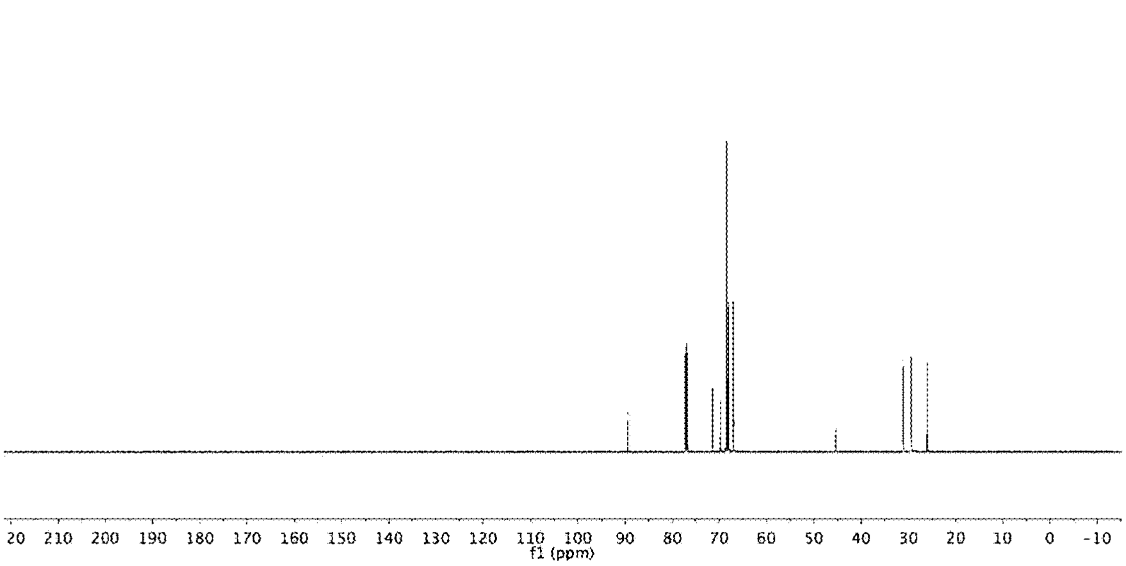
Figure 5:
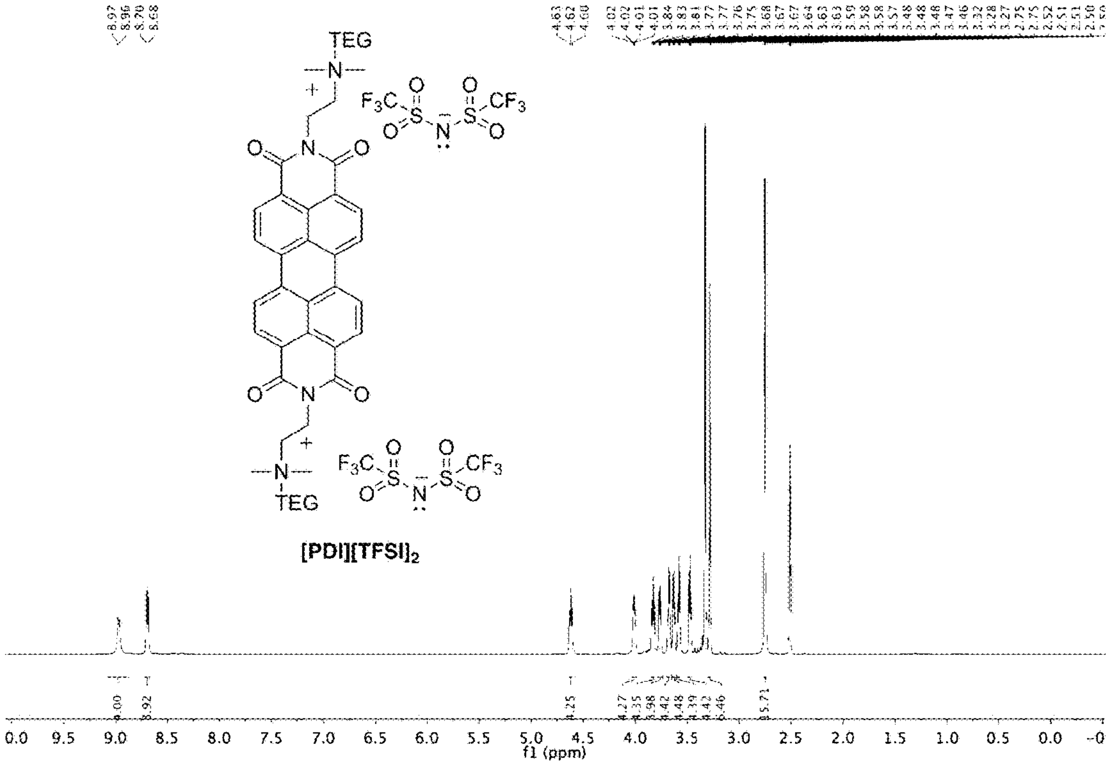
FIG. 5. $^1H$ NMR (upper panel) and $^{13}C$ NMR spectra (lower panel) of $[PDI][TFSI]_2$.
Figure 5:
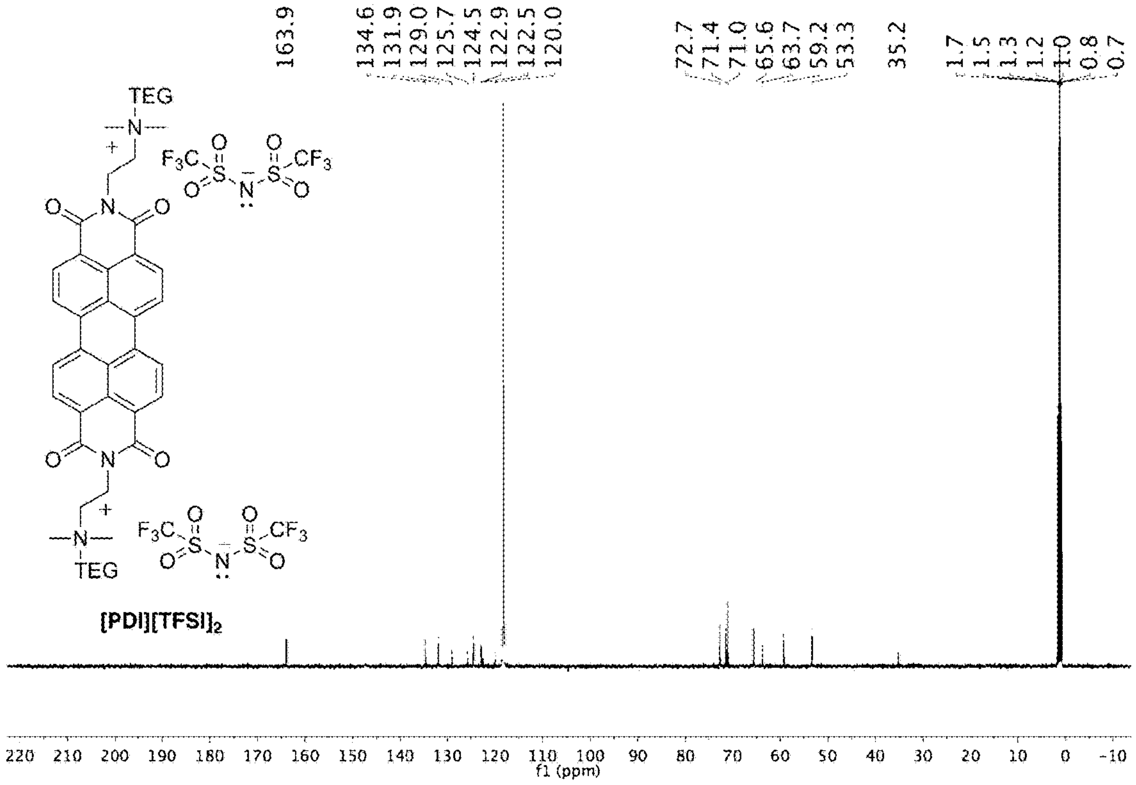

In certain embodiments, $[PDI][TFSI]_2$ and $[Fc_4]$ can be synthesized as the active component for the negative and positive half cells. Due to its accessible 2-electron reduced state, electrochemical stability, and its straightforward derivatization, $[PDI][TFSI]_2$ can be synthesized as a double tetra-alkyl ammonium salt with a glycol chain, achieving enhanced solubility. Ferrocene, commonly used in organometallic redox chemistry, can have an oxidation-reduction couple and can be derivatized. $[Fc_4]$ can be synthesized as dendrimer-like tetraferrocene specie which can be viscous oil in diglyme. The dendrimer-like structure of $[Fc_4]$ can reduce its ability to crossover the membrane. Exemplary synthesis schemes of $[Fc_4]$ and $[PDI][TFSI]_2$ are shown in FIGS. 2 and 3, and exemplary NMR spectra of $[Fc_4]$ and $[PDI][TFSI]_2$ are shown in FIGS. 4 and 5.

In another aspect, the present disclosure provides a redox flow battery, which includes a cathode cell including a catholyte; an anode cell including an anolyte, wherein at least one of the catholyte and the anolyte includes the organic electrolytes disclosed herein. In certain embodiments, the anolyte includes a derivative of PDI. In certain embodiments, the PDI derivative is $[PDI][TFSI]_2$. In certain embodiments, the catholyte includes a ferrocene derivative. In certain embodiments, the ferrocene derivative is $[Fc_4]$. In certain embodiments, the redox flow battery includes a cathode cell including a cathode and a catholyte; an anode cell including an anode and an anolyte, wherein the anolyte is $[PDI][TFSI]_2$ and the catholyte is $[Fc_4]$.

In certain embodiments, the redox flow battery disclosed herein further includes a cathode and an anode. In certain embodiments, the cathode is a carbon felt electrode or a carbon paper electrode. In certain embodiments, the anode is a carbon felt electrode or a carbon paper electrode. In certain embodiments, the redox flow battery further includes a membrane as a separator, disposed between the cathode cell and the anode cell. Any suitable membrane known in the art can be used with the present disclosure. In certain embodiments, the membrane is an ion exchange membrane. In certain embodiments, the membrane is a membrane disclosed in U.S. Provisional Application No. 62/699,489.

Figure 6A:
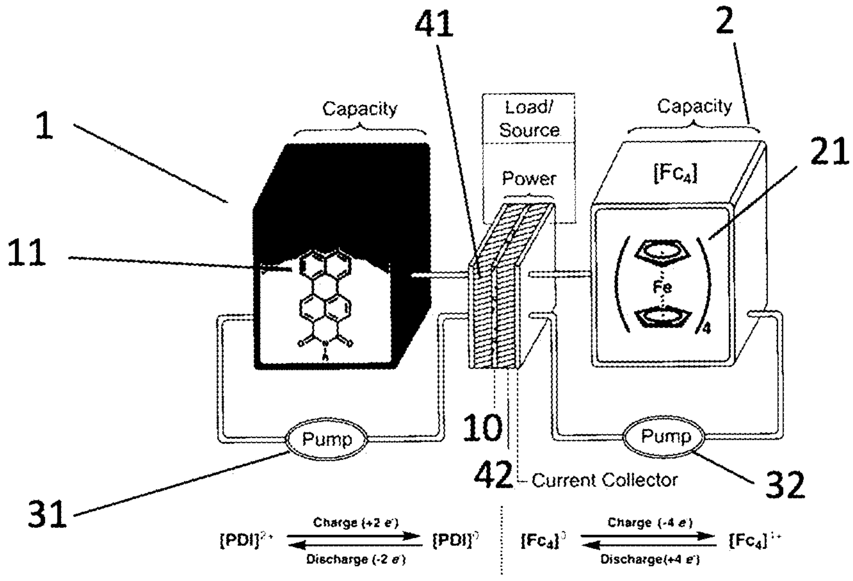
FIGS. 6A-6C. (A) Schematic of a redox flow battery. (B) Structure of the active electrolytes employed in this example. (C) Schematic showing the charge and discharge status of the electrolytes and an exemplary battery.
Figure 6B:
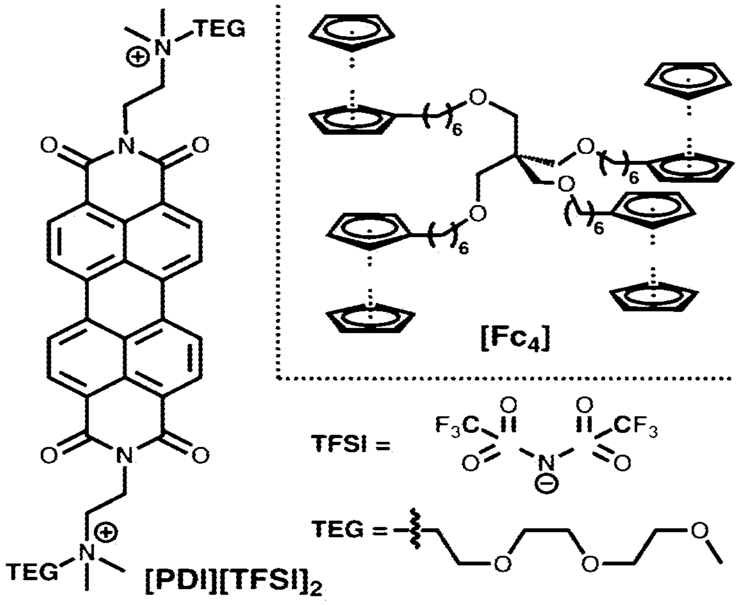
Figure 6C:
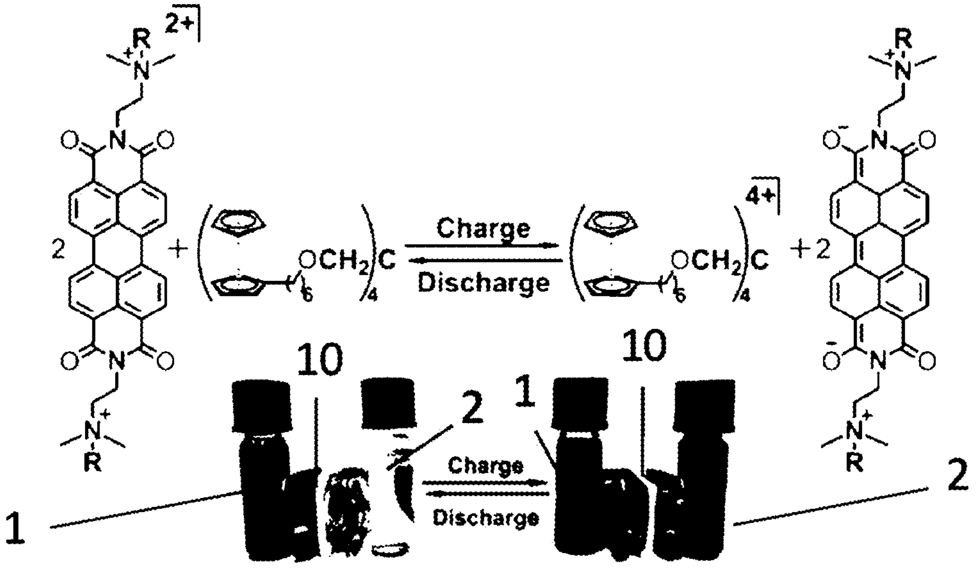

The redox flow battery according to an embodiment of the present disclosure shown in FIG. 6A includes the anode cell 1 including the anolyte 11 ($[PDI][TFSI]_2$) and the anode 41, the cathode cell 2 including the catholyte 21 ($[Fc_4]$) and the cathode 42, and the membrane 10 disposed between the anode cell 1 and the cathode cell 2. The anolyte 11 and the catholyte 21 respectively circulate through pumps 31 and 32. Charging and discharging occur in the anode 41 and cathode 42 according to a change of oxidation states of ions. The ion exchange membrane 10 prevents ions of active materials of the catholyte 11 and the anolyte 12 from being mixed with each other and permits only ions of a charge carrier of a supporting electrolyte to be transferred. Redox reactions for $[PDI][TFSI]_2$ and $[Fc_4]$ are displayed for the charging and discharging process in the inset of FIG. 6A. The molecular structures and the charging/discharging reactions of anolyte 11 and catholyte 12 are shown in FIGS. 6B-6C. In certain embodiments, the redox flow battery is in a static cell (e.g., H-cell configuration, see FIG. 6C for a non-limiting embodiment H-cell configuration, and redox reactions occurring at the negative and positive electrode) including carbon felt as electrodes.

Figure 7A:
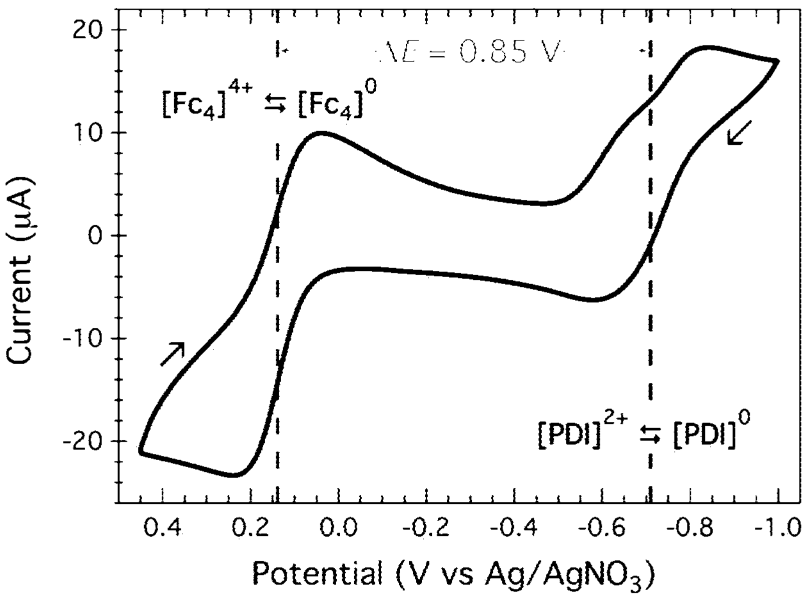
FIG. 7A-7F. (A) Cyclic voltammetry of $[Fc_4]$ and $[PDI][TFSI]_2$. (B, C) Cycling data for the battery $[PDI]^0|[PDI]^{2+}||[Fc_4]_4^+|[Fc_4]^0$ (2.42 mM/1.14 mM). (B) Repeated charge (lower hollow circles)/discharge (lower filled circles) cycling over 50 cycles at 1 C (1.6 $mA/cm^2$) in a static cell as denoted in the figure. The coulombic efficiency (top circles) is also plotted as denoted in the figure. (C) Selected charge and discharge profiles. (D) Cycling data for low concentration cell assembled using 1.17 mM $[Fc_4]$ and 1.8 mM $[PDI][TFSI]_2$. (E) Cycling data for high concentration cell using 0.4 M electron equivalents (0.2 M $[PDI][TFSI]_2$ and 0.1 M $[Fc_4]$). (F) Raw data of the repeated cycling shown in FIG. 7B.
Figure 7B:
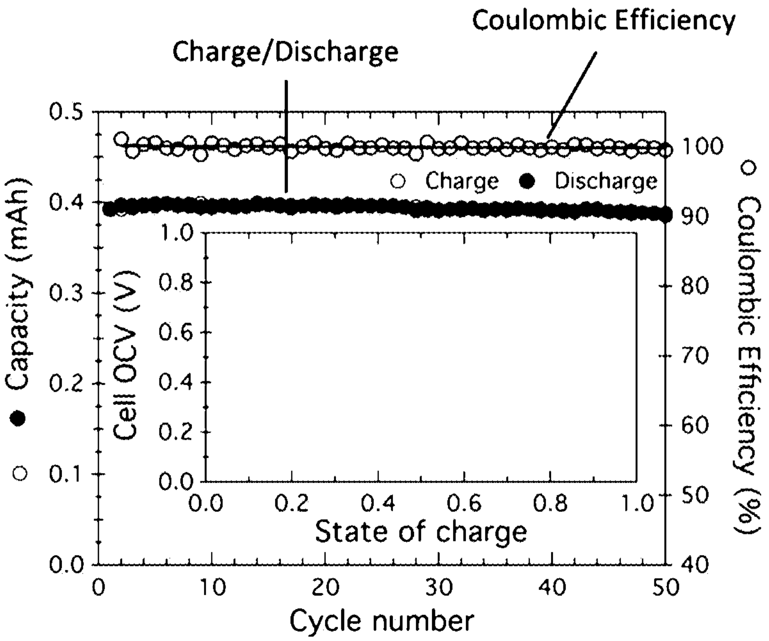
Figure 7C:
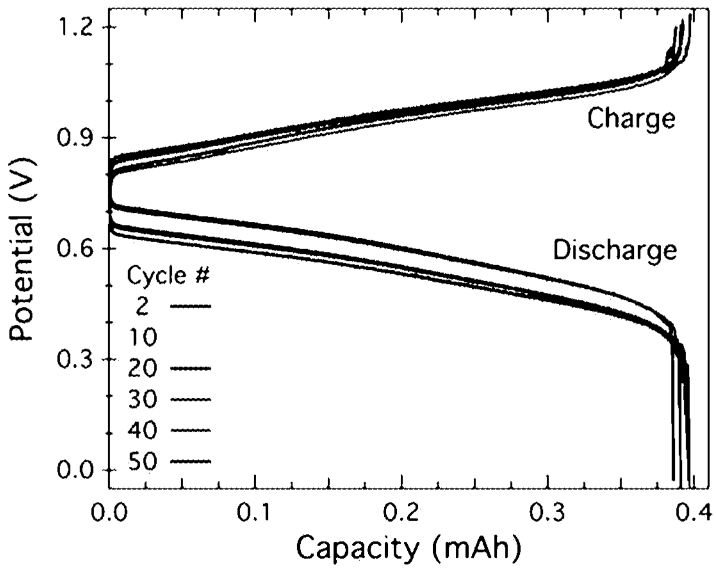

In an exemplary battery using $[Fc_4]$ and $[PDI][TFSI]_2$ as electrolytes and 0.1 M $LiPF_6$ as supporting electrolyte, stability of the battery was measured. The cyclic voltammetry was scanned at 50 mV/s in 4:1 MeCN:THF (FIG. 7A). Capacity of repeated charge/discharge cycling over 50 cycles at 1 C (1.6 $mA/cm^2$) in a static cell was measured with voltage limited from 0 to 1.2 V (FIG. 7B). Linearly fitting obtained a slope representing a fade of 0.0453% per cycle for the discharge capacity. The coulombic efficiency had an average of 99.954% (FIG. 7B), and cell open circuit voltage (OCV) was also measured at different states of charge (FIG. 7B insert). Selected charge and discharge profiles were presented in FIG. 7C, showing a small shift during the first 40 cycles where the initial capacity of ~87% SOC settles to ~81% SOC at around cycle 40.

Figure 7D:
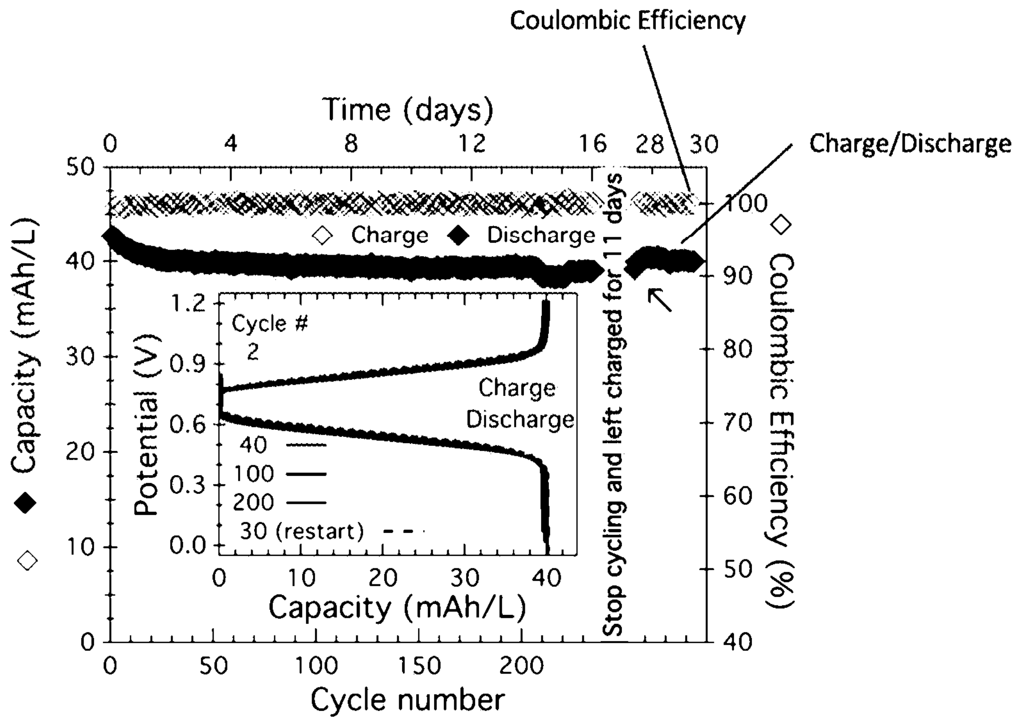
Figure 7E:
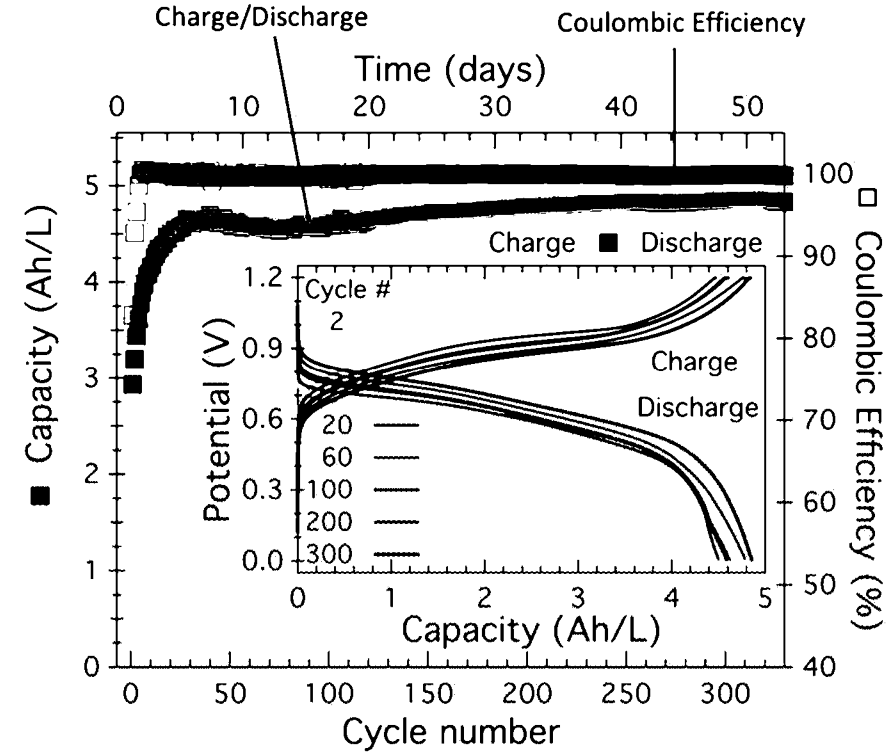
Figure 7F:
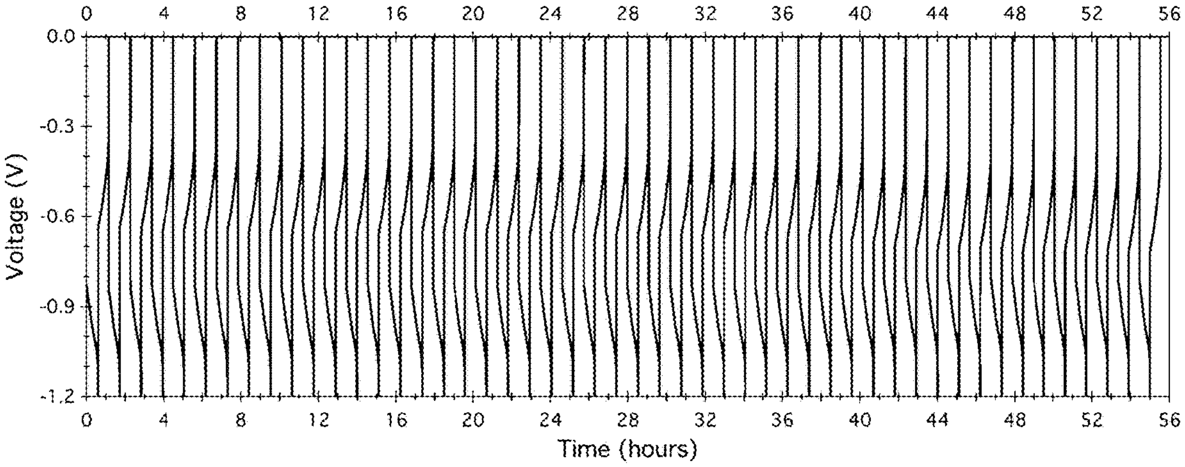
Figure 8A:
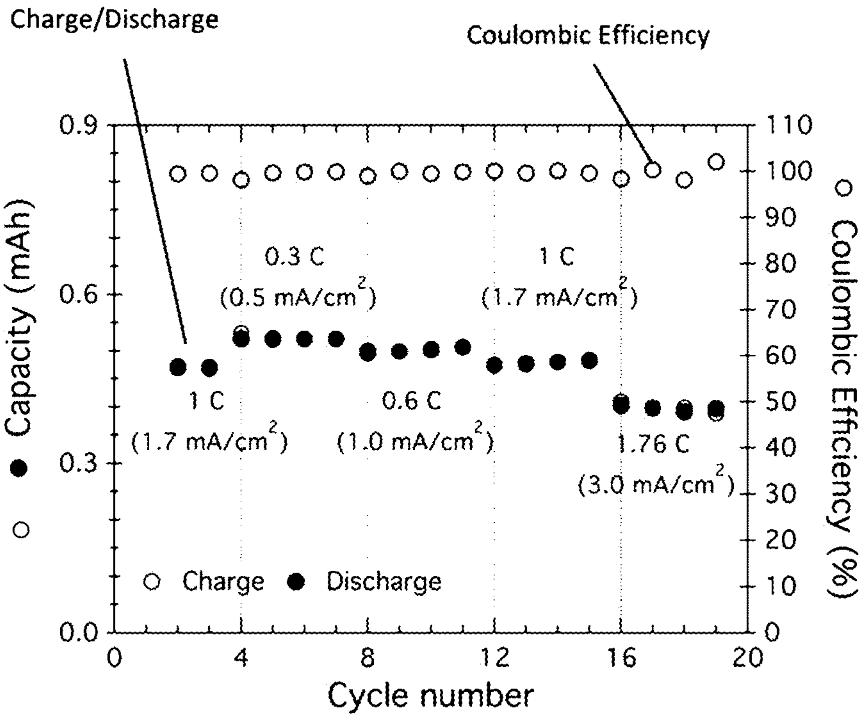
FIGS. 8A-8B. (A) Capacity and Coulombic efficiency at different current densities in $mA/cm^2$. (B) Capacity as a function of potential for selected charge and discharge cycles at different current densities.
Figure 8B:
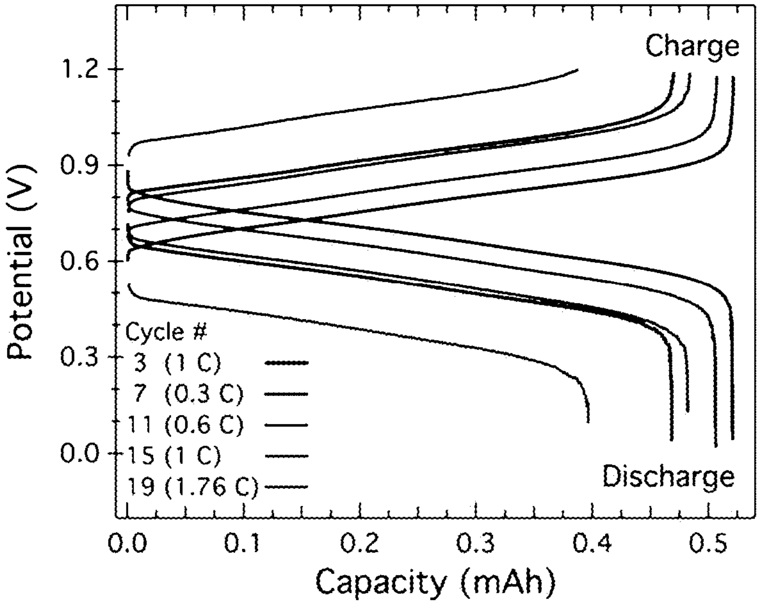

A low concentration cell assembled using 1.17 mM $[Fc_4]$ and 1.8 mM $[PDI][TFSI]_2$ was created, and the capacity retention for the charge and discharge process over 230 cycles at 1 C (1.16 mA/cm2) in a stirred H-cell was measured (FIG. 7D). After an initial small decrease in capacity, the charge and discharge capacity settled after cycle 40. Linearly fitting this data from 40 to 235, a slope was obtained representing a fade of 0.00614% per cycle for the discharge capacity. The Coulombic efficiency was also plotted and has an average of 99.955%. Cycling was paused in the charged state for 11 days. The first discharge (diamond pointed by arrow) and subsequent cycling showed negligible capacity loss. A high concentration cell using 0.4 M electron equivalents (0.2 M $[PDI][TFSI]_2$ and 0.1 M $[Fc_4]$) was also created. Charge (lower hollow square) and discharge (lower filled square) capacities were shown for >450 cycles corresponding to more than 74 days of operation (FIG. 7E). The average CE (top hollow squares) above cycle 5 was 99.868%. In both cells (FIGS. 7D and 7E), Li[TFSI] was used as supporting electrolyte, and the voltage was limited from 0 to 1.2 V. Insets in FIGS. 7D and 7E displayed selected charge and discharge profiles for their corresponding cell. In an exemplary embodiment, the battery included 2.42 mM [PDI][TFSI]2 and 1.14 mM $[Fc_4]$ in a mixture of acetonitrile/diglyme (10:1) with 0.5 M $LiPF_6$ as the charge balancing salt. After being allowed to settle in at a 1 C current (1.7 $mA/cm^2$), the current density was dropped to 0.3 C (0.5 $mA/cm^2$) and increased in a stepwise manner to the values shown in FIGS. 8A-8B.

In certain embodiments, the membrane is a dialysis and size exclusion membrane. In certain embodiments, the membrane is made from cellulose. The membrane separates the anolyte and catholyte and prevents the crossover of the active components at wide ranges of voltages (e.g., more than about 3V) and temperatures (e.g., from about −20° C. to about 110° C.).

Figure 9A:
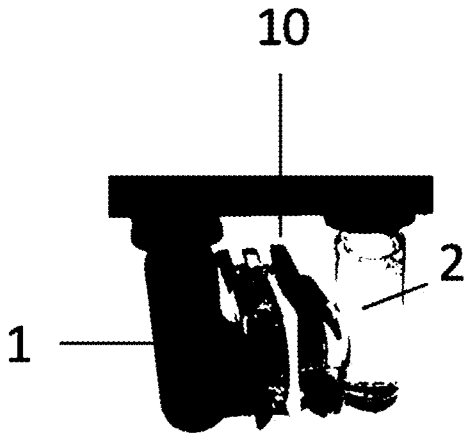
FIGS. 9A-9D. H-cells with $[PDI][TFSI]_2$ and $LiPF_6$ were treated with (A) sodium naphthalenide and (B) $NOBF_4$ followed by dialysis for 15 h. (C, D) Cycling data of an H-cell assembled with membranes treated under the following conditions: sodium naphthalenide (circles), $NOBF_4$ (squares), 110° C. (triangles) and −20° C. (diamonds). (C) capacity was measured as mAh; (D) capacity was measured as mAh/L. For each condition, the plotted top signs represent coulombic efficiency, the plotted lower signs represent charge (hollow)/discharge (filled) measurements FIG. 10. Molar absorptivity of $[PDI][TFSI]_2$ in acetonitrile plotted against wavelength (11 μM, 1 cm pathlength).
Figure 9B:
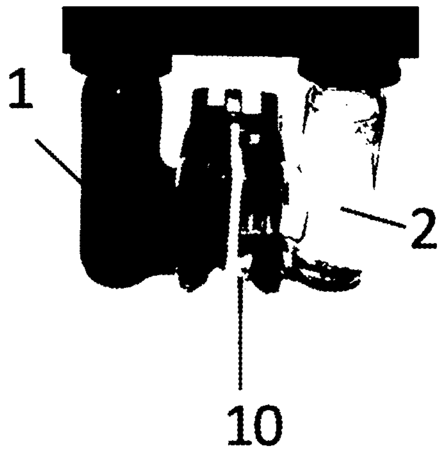
Figure 9C:
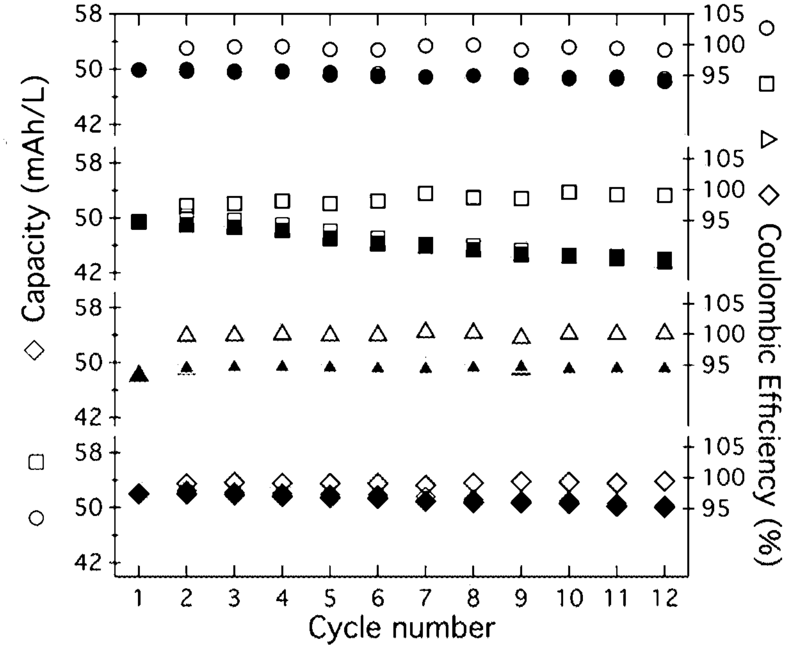
Figure 9D:
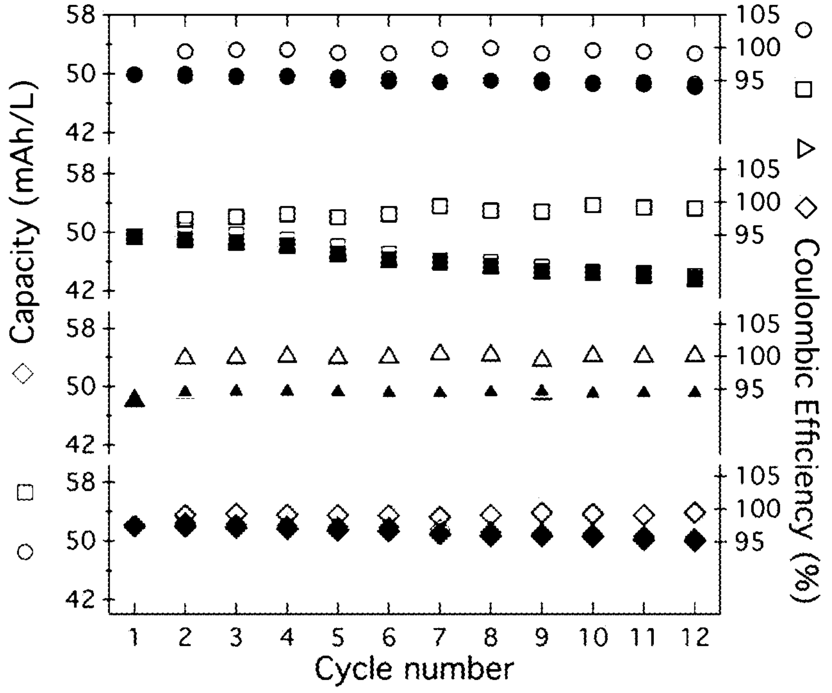

In certain embodiments, the membrane was soaked in a solution of sodium naphthalenide (approximately −3.0 V vs $Fc^{0/+}$) and subsequently assembled an H-cell with this membrane. One chamber of the H-cell was filled with $[PDI][TFSI]_2$ in acetonitrile, while the other contained pure acetonitrile. $[PDI][TFSI]_2$ was used for crossover experiments due to its smaller sized and strong absorption. After stirring overnight, no detectable crossover of the $[PDI][TFSI]_2$ was visibly observed (FIG. 9A). Strongly oxidizing ($NOBF_4$, c.a. 0.9 V vs $Fc^{0/+}$) conditions yielded similar results but with a slight fluorescence from crossover of the $[PDI][TFSI]_2$ (FIG. 9B). Cycling showed a small monotonic fade presumably due to crossover of the active electrolytes (FIGS. 9C-9D).

Figure 10:
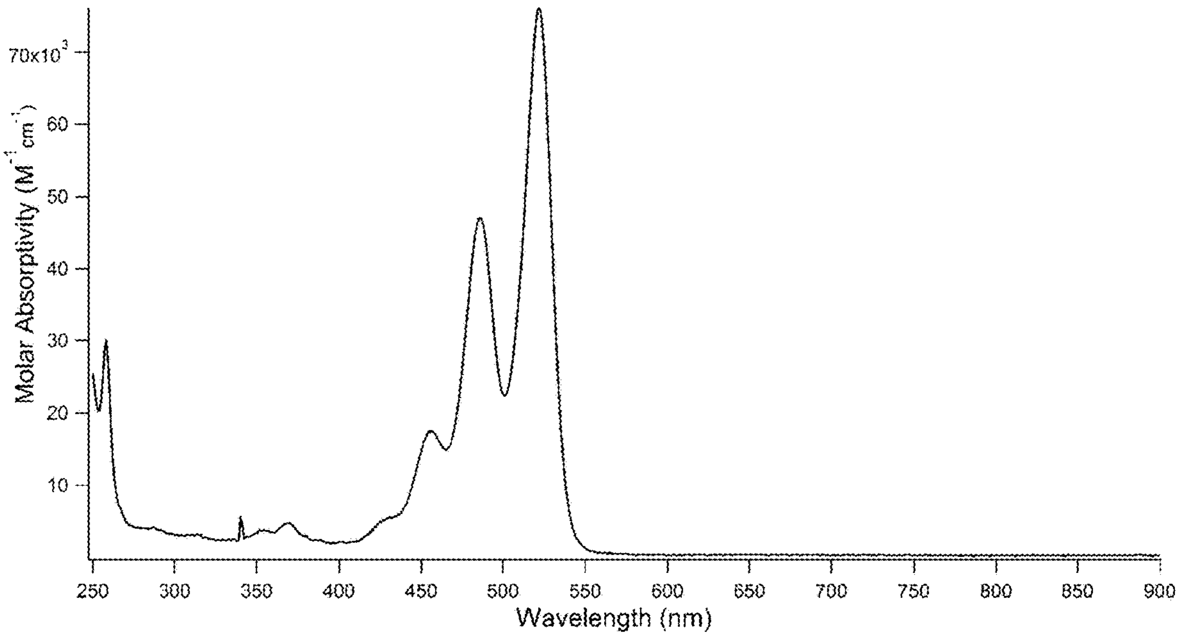

In certain embodiments, ion exchange occurs between anolyte and catholyte through the membrane. In some embodiments, the membrane can operate in reducing or oxidizing condition. For example, the membrane can prevent crossover of the active components after about 4 hours exposure to sodium napthalenide or anhydrous diglyme solution (0.05% over 12 days, FIGS. 10 and 11).

Figure 11:
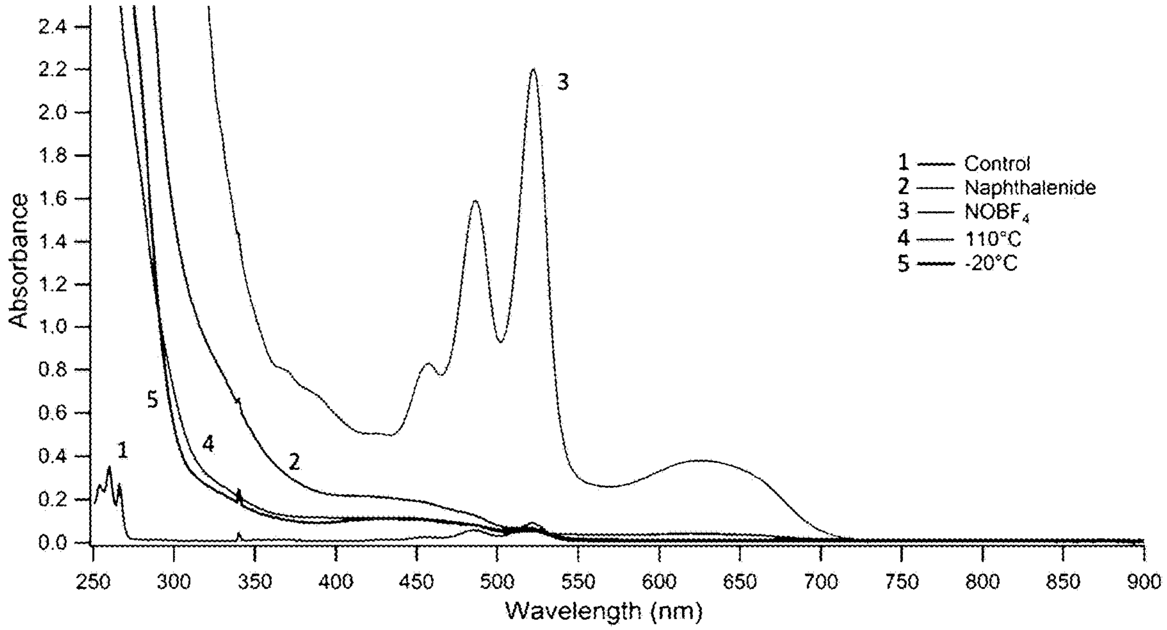
FIG. 11. UV-Vis absorbance spectra of the $[Fc_4]$ side of H-cells from membrane stability experiments. The broad peak at ~625 in the NOBF4-treated membrane spectrum arises from the presence of oxidized $[Fc_4]$.
Figure 12A:
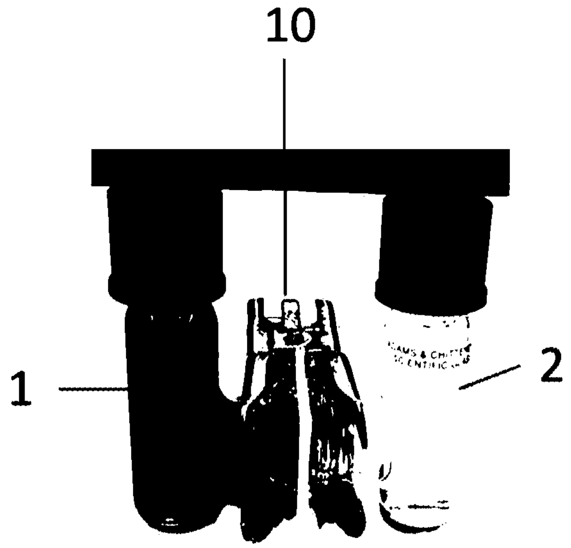
FIGS. 12A-12E. Photographs of the H-cells with $[PDI][TFSI]_2$ and $LiPF_6$ in acetonitrile on one side and blank acetonitrile on the other side. (A) Control after 12 days. (B) H-cell where membrane was heated to 110° C. after 15 h. (C) H-cell where membrane was cooled to −20° C. after 15 h. (D) H-cell with sodium naphthalenide-treated membrane after 15 h. (E) H-cell with $NOBF_4$-treated membrane after 15 h.
Figure 12B:
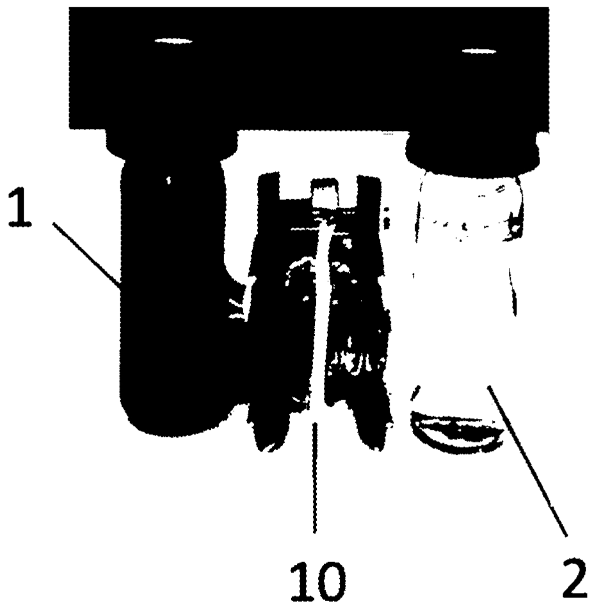
Figure 12C:
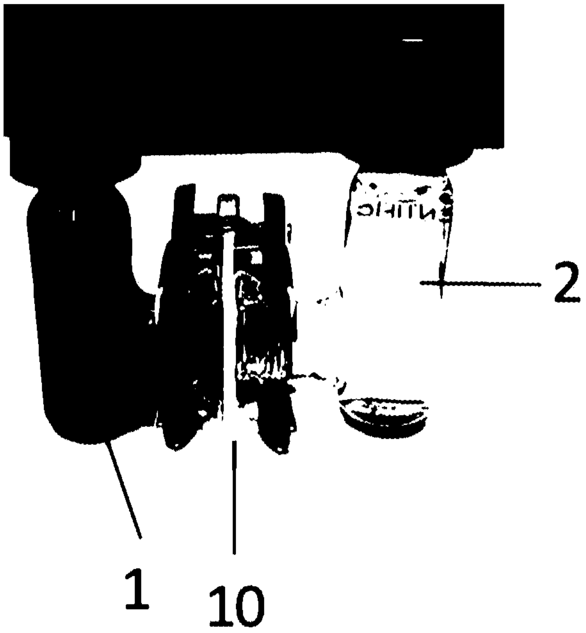
Figure 12D:
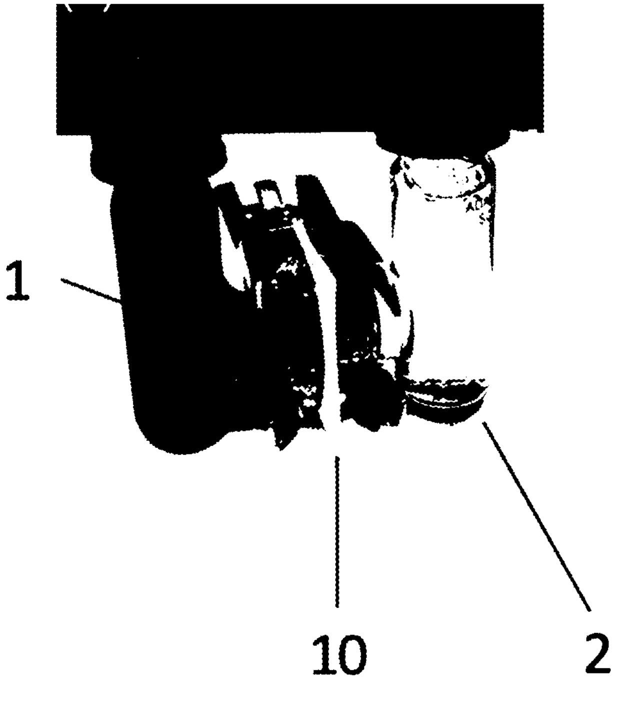
Figure 12E:
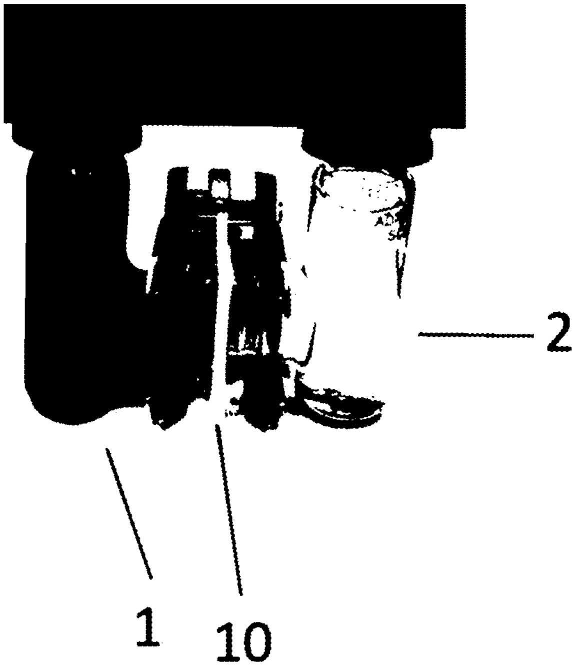

In one embodiment as shown in FIGS. 12A-12E, the membrane stability was measured H-cells with $[PDI][TFSI]_2$ and $LiPF_6$ in acetonitrile at anode cell 1 and blank acetonitrile on the cathode cell 2 and membrane 10 was disposed in between. Different conditions were tested including (12B) membrane heated to 110° C. after 15 h, (12C) cooled to −20° C. after 15 h, (12D) H-cell with sodium naphthalenide-treated membrane after 15 h, and (12E) H-cell with $NOBF_4$-treated membrane after 15 h. It was found that the membrane was stable at high (110° C.) and low (−20° C.) temperatures (FIG. 11)

Figure 13:
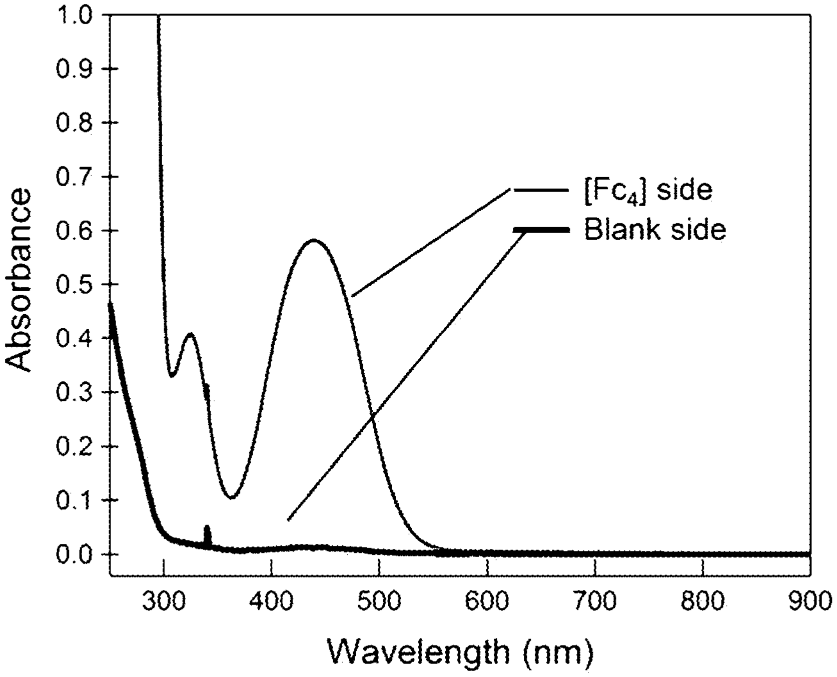
FIG. 13. Absorbance of the blank side and $[Fc_4]$ side plotted against wavelength.

In one embodiment, crossover of the $[Fc_4]$ molecule in its neutral state was monitored by dissolving 31 mg in THE and putting this solution on one side of an H-cell with the 3.5 kDa membrane with blank THE on the other side (FIG. 13). Using the molar absorptivity of $[Fc_4]$ (423.67 $M^{-1}$ $cm^{-1}$ at 439 nm), the crossover was found to be 0.60% (FIG. 13). In comparison, unsubstituted monomeric ferrocene diffused through a 1 kDa membrane overnight.

Figure 14A:
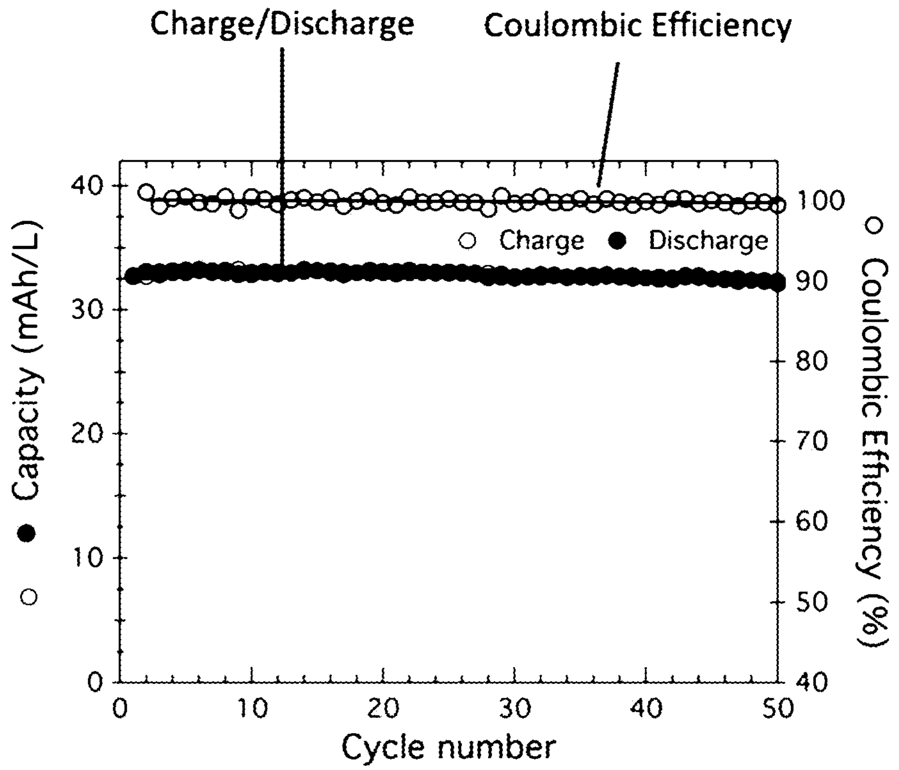
FIGS. 14A-14B. Cycling data for the battery $[PDI]^0|[PDI]^{2+}||[Fc_4]^{4+}|[Fc_4]^0$ (2.42 mM/1.14 mM) using 0.5 M $LiPF_6$ as supporting electrolyte. (A) Repeated charge (lower hollow circles)/discharge (lower filled circles) cycling over 50 cycles at 1 C (1.6 mA/cm2) in a static cell. (B) Selected charge and discharge profiles.
Figure 14B:
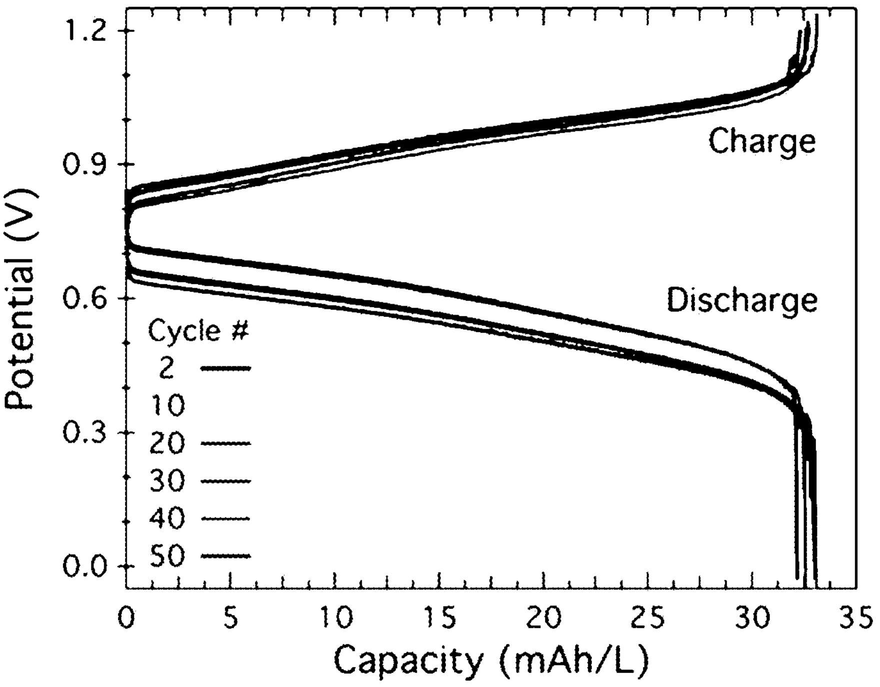
Figure 15:
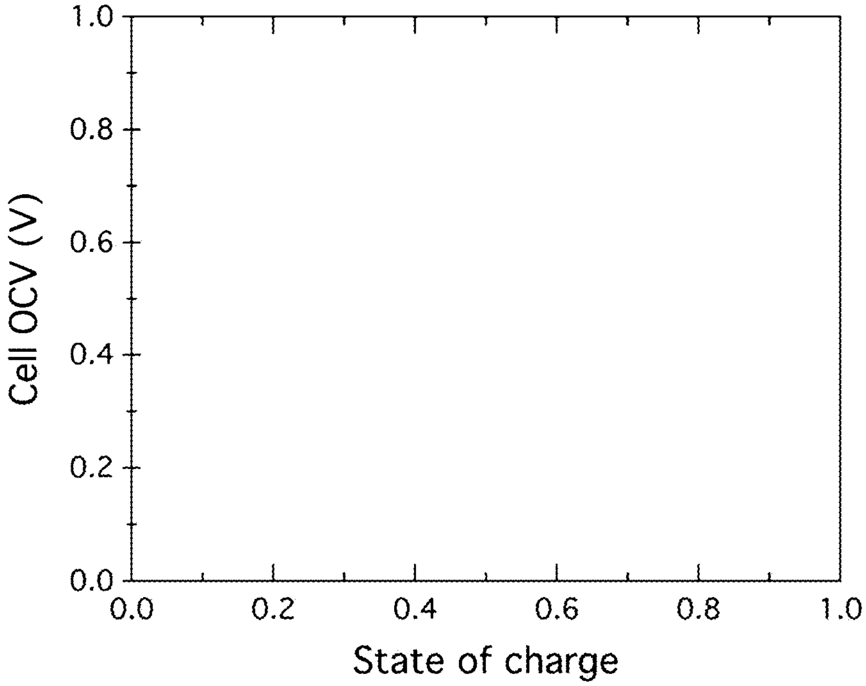
FIG. 15. Cell open circuit voltage (OCV) at different states of charge for the battery $[PDI]^0|[PDI]^{2+}||[Fc_4]^{4+}|[Fc_4]^0$ (2.42 mM/1.14 mM) using 0.5 M LiPF6 as supporting electrolyte.
Figure 16:
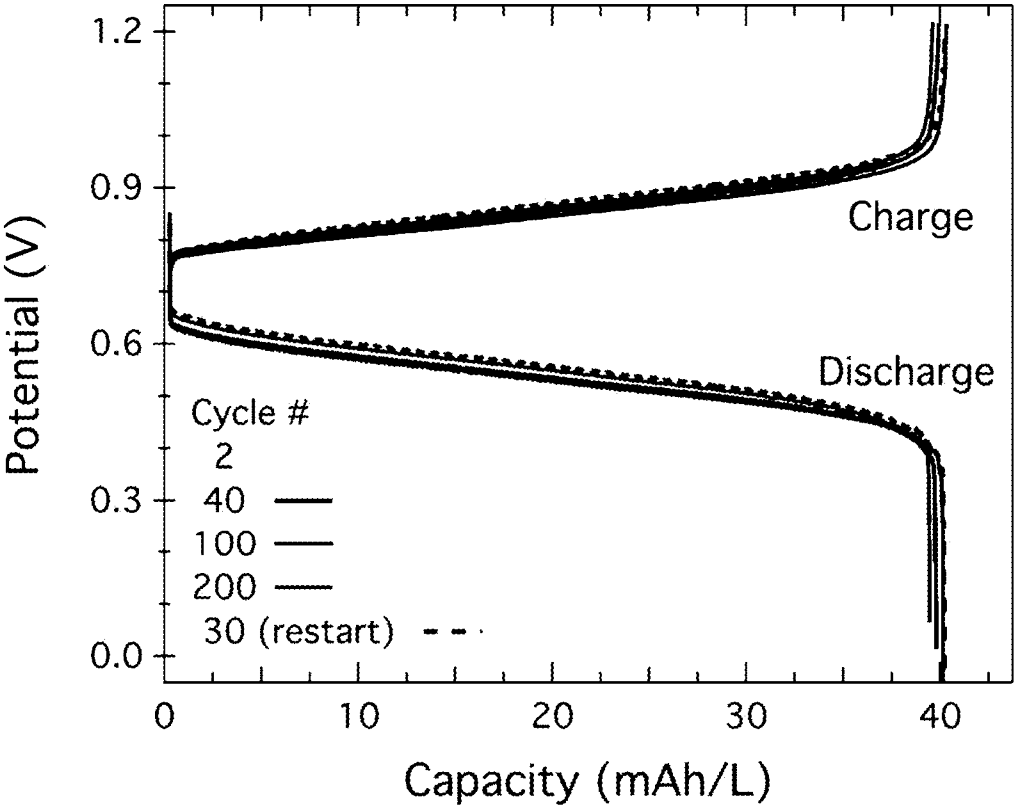
FIG. 16. Selected charge and discharge profiles for the low concentration cell assembled using 1.8 mM $[Fc_4]$ and 1.17 mM $[PDI][TFSI]_2$.
Figure 17:
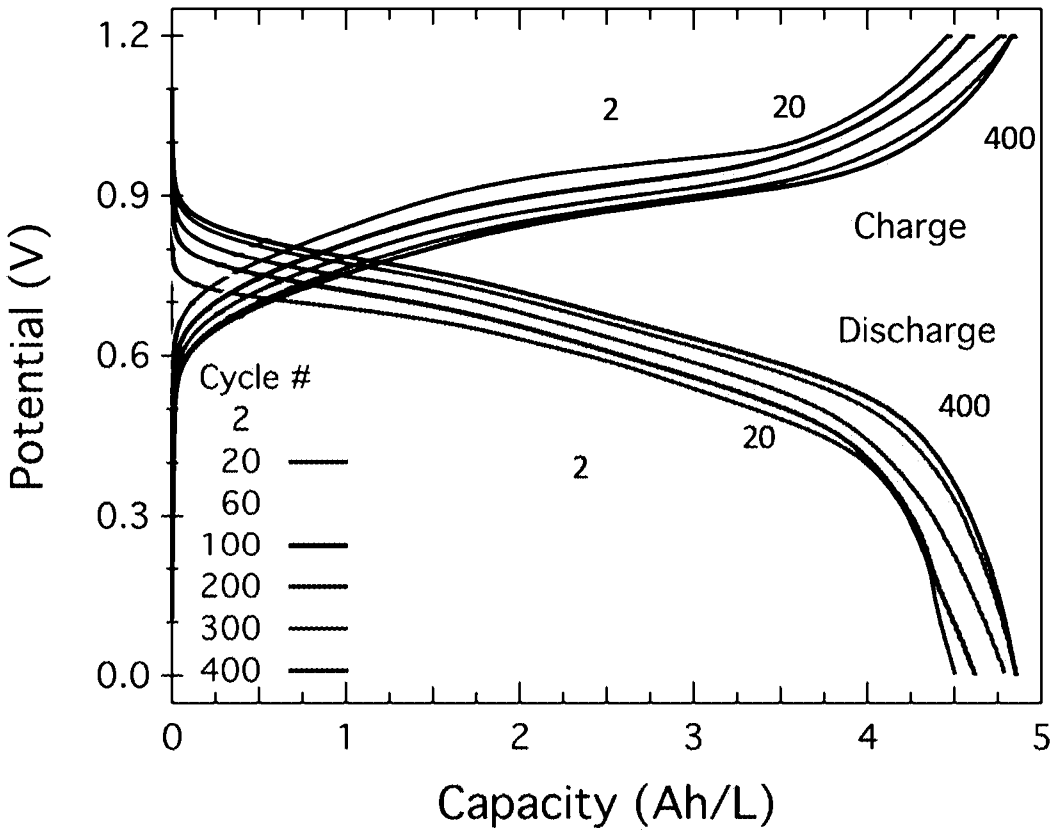
FIG. 17. Selected charge and discharge profiles for the high concentration cell assembled using 0.1 M $[Fc_4]$ and 0.2 M $[PDI][TFSI]_2$.

In certain embodiments, the redox flow battery further includes a supporting electrolyte. In certain embodiments, the supporting electrolyte is lithium hexafluorophosphate (LiPF6) that enhances conductivity. In certain embodiments, the supporting electrolyte is lithium bistrifluoromethanesulfonimide (LiTFSI) that enhances conductivity. In certain embodiments, the supporting electrolyte can pass though the membrane and can have electrical conductivity in organic solvent. The long-term stability battery cycling was explored using 0.5 M LiPF6 (FIGS. 14A-14B) as the charge balancing salts, and the battery include $[PDI]^0|[PDI]^{2+}||[Fc_4]^{4+}|[Fc_4]^0$ (2.42 mM/1.14 mM). The voltage was limited from 0 to 1.2 V. The coulombic efficiency (blue circles) is also plotted and has an average of 99.954% (FIG. 14A). In addition, there is a small shift of the discharge curve towards higher output voltage, which in turn means a higher power output. FIG. 15 showed cell open circuit voltage (OCV) at different states of charge for the battery $[PDI]^0|[PDI]^{2+}||[Fc_4]^{4+}|[Fc_4]^0$ (2.42 mM/1.14 mM) using 0.5 M LiPF6 as supporting electrolyte. FIG. 16 showed selected charge and discharge profiles for the low concentration cell assembled using 1.8 mM $[Fc_4]$ and 1.17 mM $[PDI][TFSI]_2$. 0.5 M Li[TFSI] was used as supporting electrolyte. Identical data as that shown in FIG. 7D inset. FIG. 17 showed selected charge and discharge profiles for the high concentration cell assembled using 0.1 M $[Fc_4]$ and 0.2 M $[PDI][TFSI]_2$. 0.5 M Li[TFSI] was used as supporting electrolyte. Identical data as that shown in FIG. 7E inset.

Any suitable solvents known in the art can be used with the present disclosure. In certain embodiment, the organic solvent is a non-aqueous solvent. Non-limiting examples of non-aqueous solvents are diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, N,N-dimethylacetamide, sulfalone, trifluorotoluene or a mixture thereof. In certain embodiments, the solvent is an aqueous solvent. In certain embodiments, the aqueous solvent includes water. In certain embodiments, the aqueous solvent further includes a salt. Non-limiting examples of the salt is selected from the group consisting of NaCl, KCl, $MgCl_2$, $CaCl_2$), and LiCl.

Figure 18A:
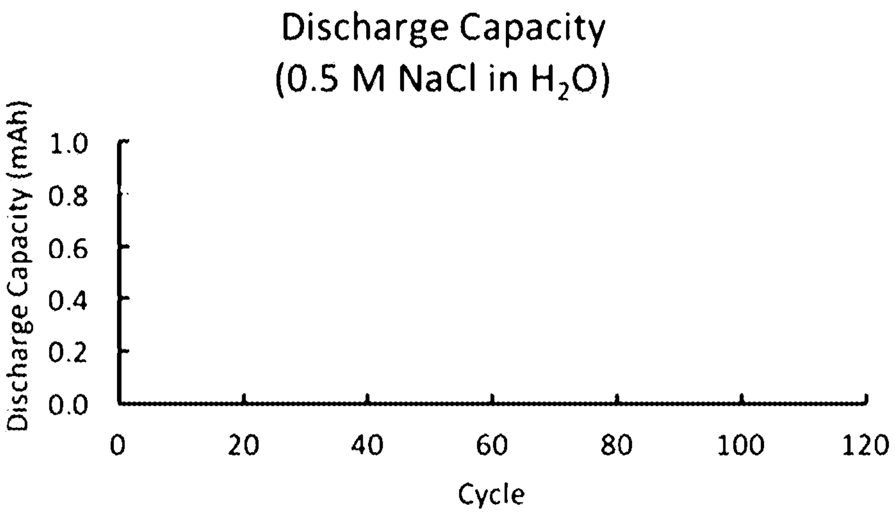
FIGS. 18A-18B. Cycling data, including discharge capacity (A) and coulombic efficiency (B) in an NaCl aqueous battery.
Figure 18B:
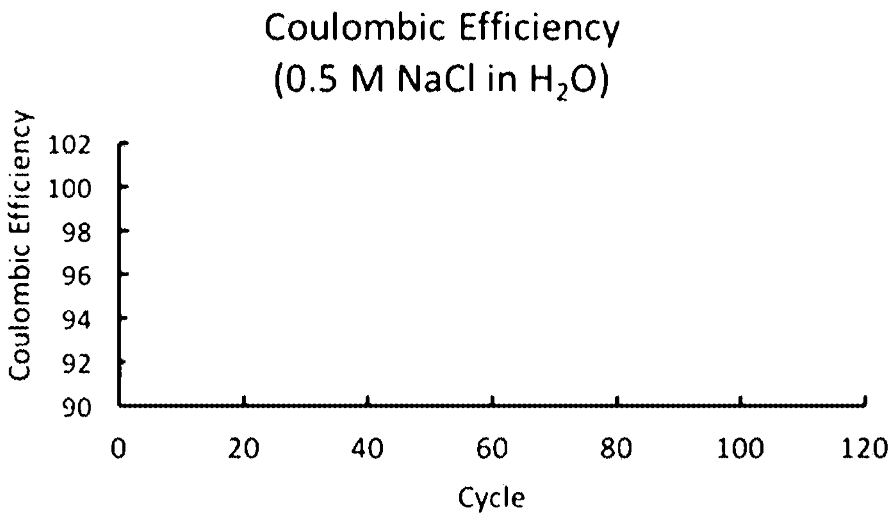

In certain embodiments, the redox flow battery is stable while it is repeatedly charged and discharged. In certain embodiments, the redox flow battery disclosed herein, at a constant 1 C (1.6 mA/cm2) current, can reach a 92% state of charge, which is above the 80% to show cycling stability. In an exemplary aqueous battery including 0.5 M NaCl in water as solvent, PDI as the anolyte, and ferrocene as catholyte, cycling data showed that it had >99.99% capacity retention, and >99.99% coulombic efficiency (FIGS. 18A-18B). In certain embodiments, the redox flow battery disclosed herein has a stable capacity retention over the charge and discharge cycles. In certain embodiments, coulombic efficiency is used as an indicator for the capacity retention, where the coulombic efficiency describes the efficiency with which electrons are transferred in a system facilitating an electrochemical reaction. In certain embodiments, the coulombic efficiency of the redox flow battery disclosed herein is close to about 99% at each cycle, over 500 charge and discharge cycles and over about 75 days.

In another aspect, the present disclosure provides spiro-fused organic compounds for use in batteries, and systems and methods for batteries including such organic compounds. In certain embodiments, the disclosed subject matter provides an organic compound having the structure of linking redox-active organic molecules through a spiro-fused motif. The redox-active organic molecules can be any organic molecules having aromatic redox cores. In certain embodiments, the organic compound has a structure represented by the following formula (I):

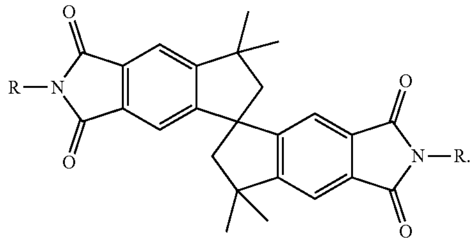

Figure 19:
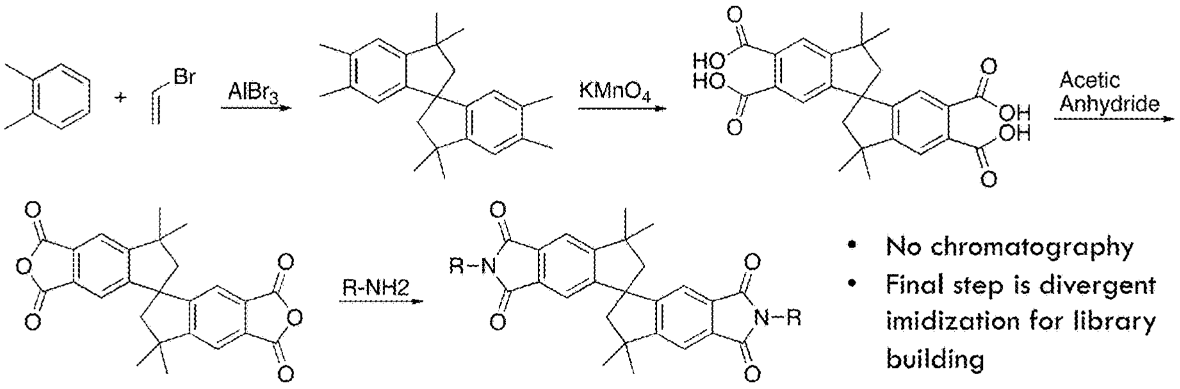
FIG. 19. Exemplary synthesis scheme for spiro-fused compounds
Figure 20:
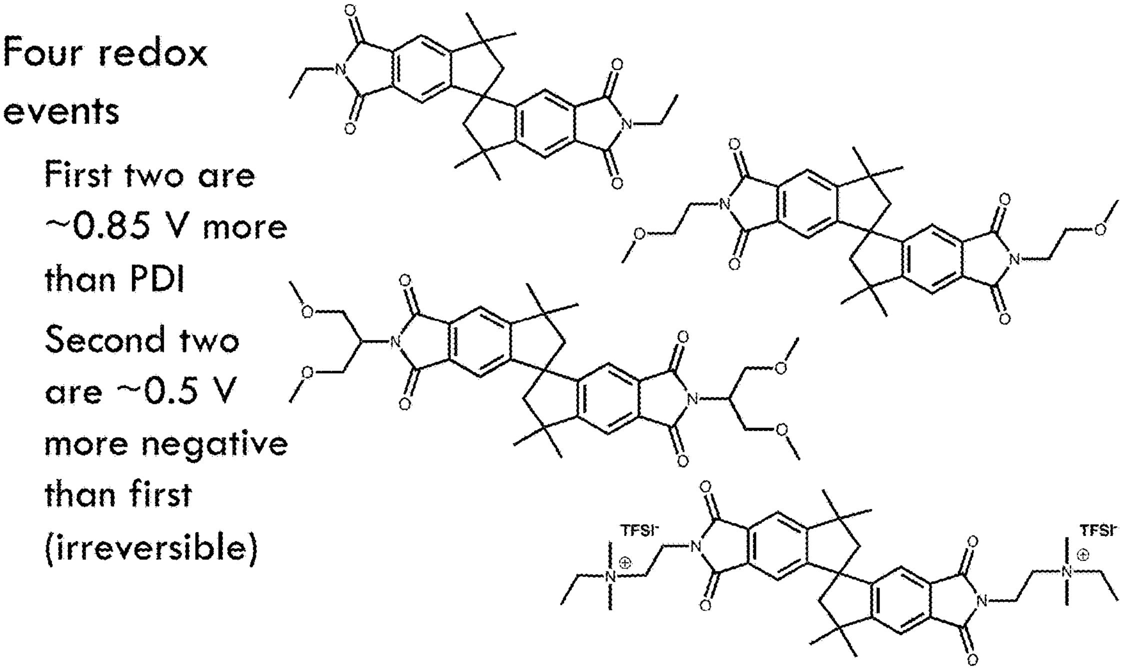
FIG. 20. Molecular structures of exemplary spiro-phthalamide compounds.

In certain embodiments, the formula (I) compound can be generated by dimerizing phthalimide redox molecules through a spiro-fused carbon cage. An exemplary method for synthesizing spiro-fused compounds disclosed herein is showed in FIG. 19. In certain embodiments, the organic compound is a derivatized spiro-phthalimide with different solubilizing chains from the imide functionality. In certain embodiments, R represents alkyl, ether, ammonium salt, or any solubilizing chain. In certain embodiments, the compound is a spiro-phthalamide compound. Non-limiting exemplary spiro-phthalamide compounds are shown in FIG. 20. In certain embodiments, R represents ethyl, and the organic compound can be a spiro-ethylphthalimide. In certain embodiments, the organic compound is a spiro-ethylcatechol.

Figure 21:
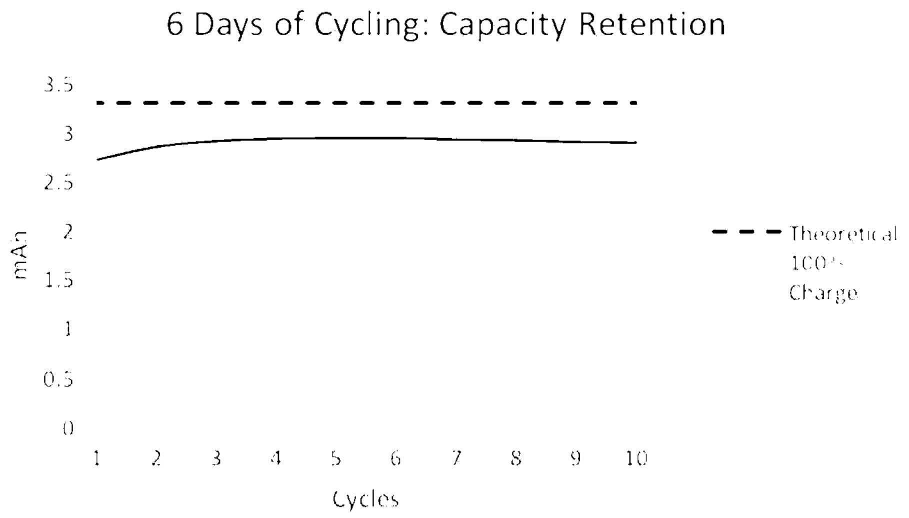
FIG. 21. Capacity as a function of cycles.
Figure 22:
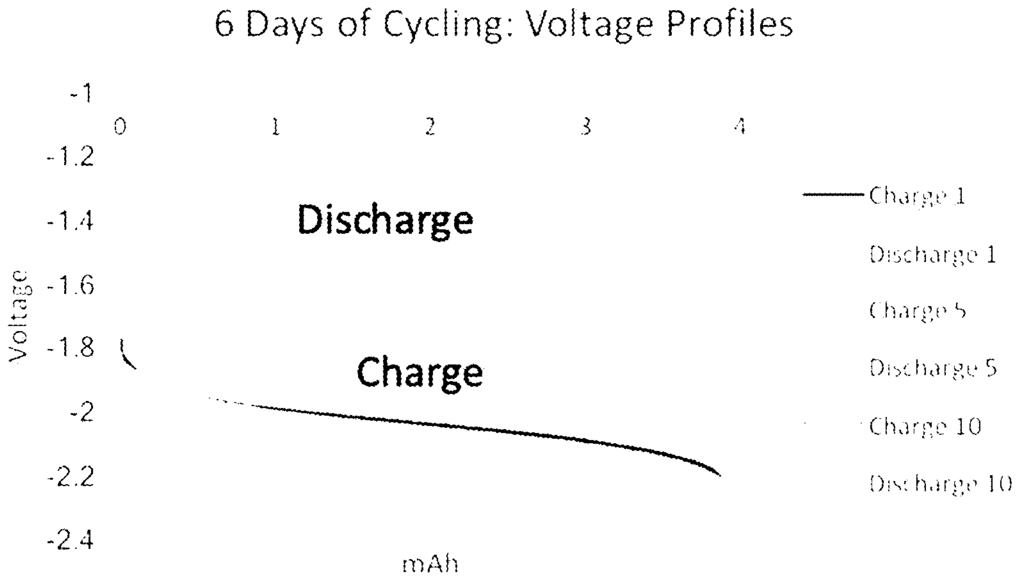
FIG. 22. Voltage profiles of ethyl-spiro-phthalamide battery.
Figure 23:
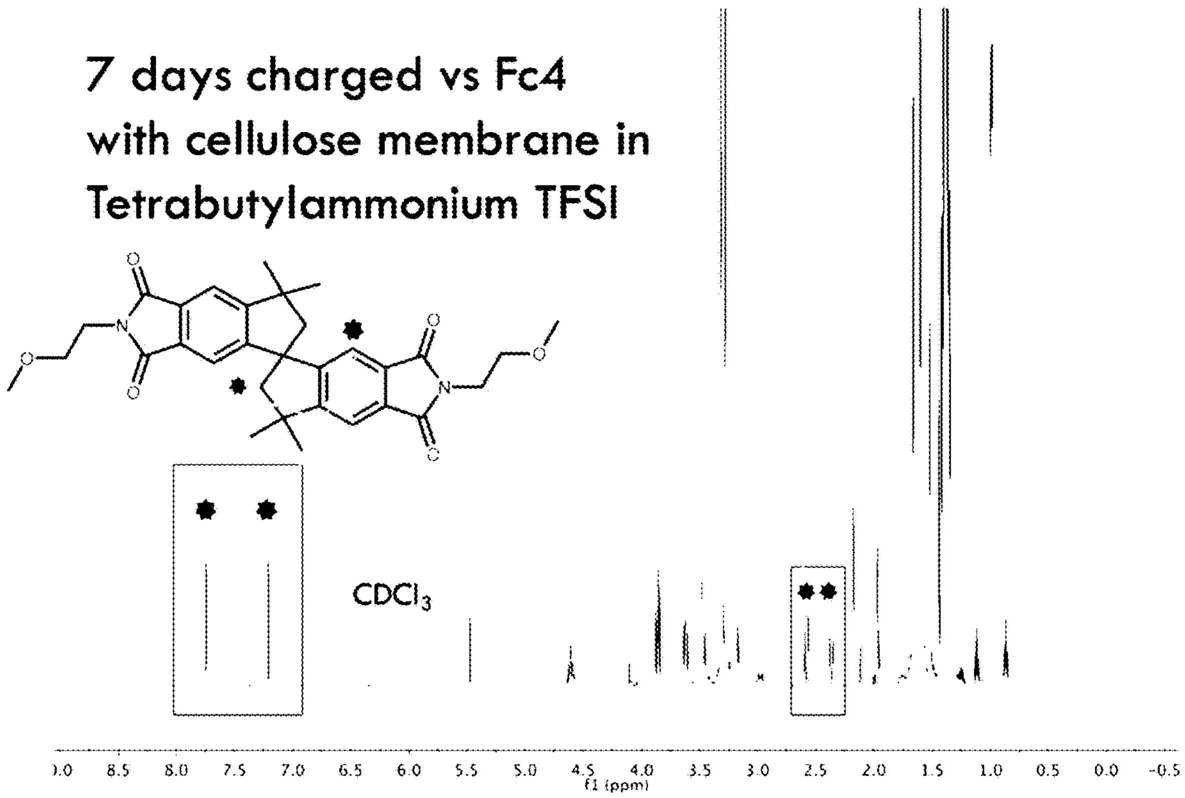
FIG. 23. $^1H$ NMR of the shown spiro molecule showing no degradation after 1 week of being charged.

In an embodiment as disclosed herein, six days of cycling revealed no degradation in capacity within the experimental limits of the instrumentation and cell configuration (FIGS. 21 & 22). No degradation was observed over 1 week of charge (FIG. 23).

The disclosed subject matter also relates to the development of higher voltage and higher capacity redox flow batteries through organic synthesis of new electrolytes, along with engineering improvements for performance. In another aspect, the present disclosure provides a redox flow battery including a spiro-fused organic compound disclosed herein, or suitable derivatives thereof. In certain embodiments, the battery includes an anolyte, wherein the anolyte includes a spiro-fused organic compound disclosed herein, or suitable derivatives thereof. In certain embodiments, the battery further includes a catholyte. In certain embodiments, the catholyte is a ferrocene derivative. In certain embodiments, the ferrocene derivative is tetraferrocene [$Fc_4$].

In certain embodiments, the battery further includes a membrane as a separator, disposed between the cathode cell and the anode cell. Any suitable membrane known in the art can be used with the present disclosure. In certain embodiments, the membrane is an ion exchange membrane. In certain embodiments, the membrane is a membrane disclosed in U.S. Provisional Application No. 62/699,489. In certain embodiments, the membrane is Daramic 175. In certain embodiments, the battery is a solid-state battery.

The battery disclosed herein can operate at temperatures and voltages outside the range of certain aqueous batteries. For example, the battery can operate at temperatures both hot and cold. This can be useful for northern and southern climates. In certain embodiment, the batteries disclosed herein can operate at high voltages which can reduce the footprint of the battery. Such feature enables development of smaller batteries, which can be useful for space limited applications. In certain embodiments, the battery disclosed herein has no degradation in capacity as shown in FIG. 21.

The disclosed subject matter can be used by energy producers in grid storage or large appliance manufacturers in home storage. In accordance with another aspect, the present disclosure provides an electricity storage system including a battery that uses a spiro-fused organic compound disclosed herein, or suitable derivatives thereof. In certain embodiments, the electricity storage system can be a large-scale electricity storage system (e.g., a grid storage system). In certain embodiments, the electricity storage system can be a small-scale electricity storage system (e.g., a home storage system).

Figure 24A:
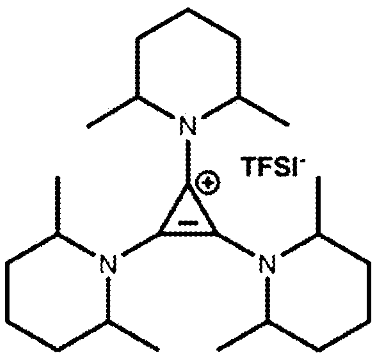
FIGS. 24A-24C. (A) Molecular structure of dimethylpiperidine cyclopropenium. (B) 3 months out of glovebox and still charged as shown by the red color. (C) Cyclic voltammogram of spiro-phthalamide and dimethylpiperidine TAC showing the open circuit voltage of a battery comprised of these compounds.
Figure 24B:
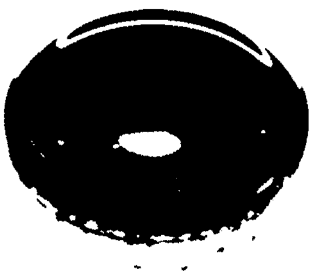
Figure 24C:
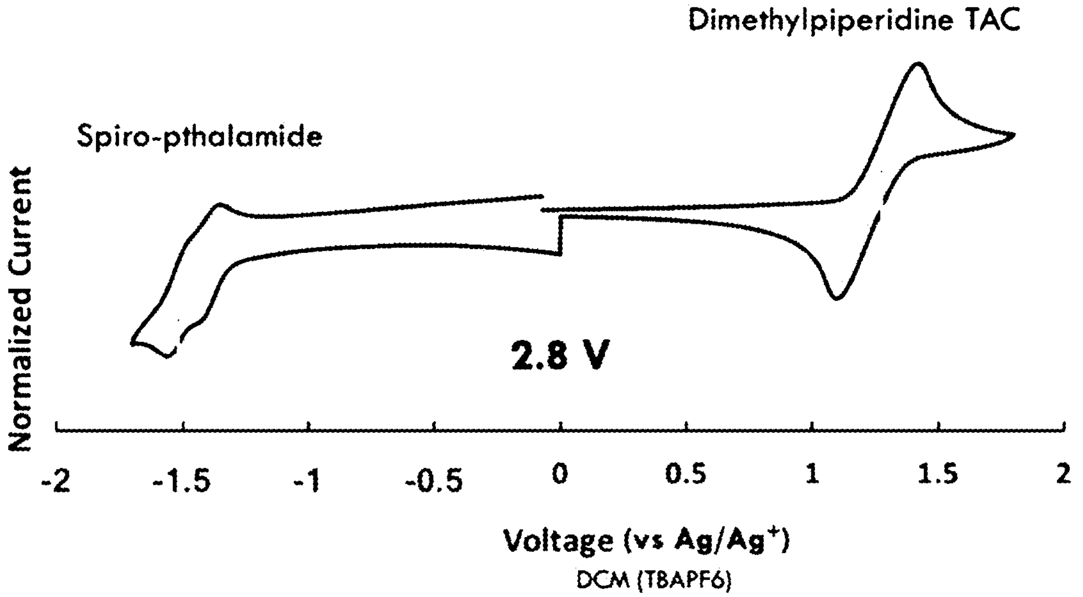

In yet another aspect, the present disclosure provides a cyclopropenium compound (a triangular molecule) for use as a catholyte in a battery for increasing catholyte voltage. In certain embodiments, the cyclopropenium compound is dimethylpiperidine cyclopropenium as shown in FIG. 24A. In certain embodiments, the cyclopropenium compound includes ring structure groups that attach to the triangular part (the cyclopropenium ion). Non-limiting exemplary ring groups include piperidine, and pyrrolidine, morpholine. Any suitable anolytes known in the art can be paired with the cyclopropenium compounds for use in a battery. In certain embodiments, the cyclopropenium compounds are paired with any anolytes disclosed herein for use in any flow battery disclosed herein. In certain embodiments, the anolyte is [PDI][$TFSI]_2$. In certain embodiments, the anolyte is a triethylammonium tail napthalene diimide (NDI). In certain embodiments, the anolyte is a spiro-fused organic compound disclosed herein.

Figure 25A:
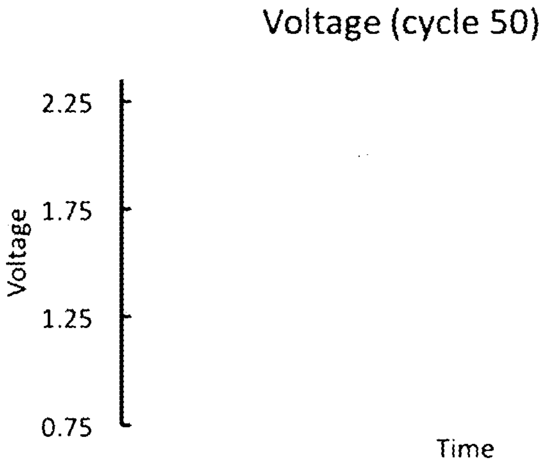
FIGS. 25A-25C. Dimethylpiperidine cyclopropenium was paired with $[PDI][TFSI]_2$ to create an H-cell battery. Voltage (A), discharge capacity (B), and coulombic efficiency (C) were measured.
Figure 25B:
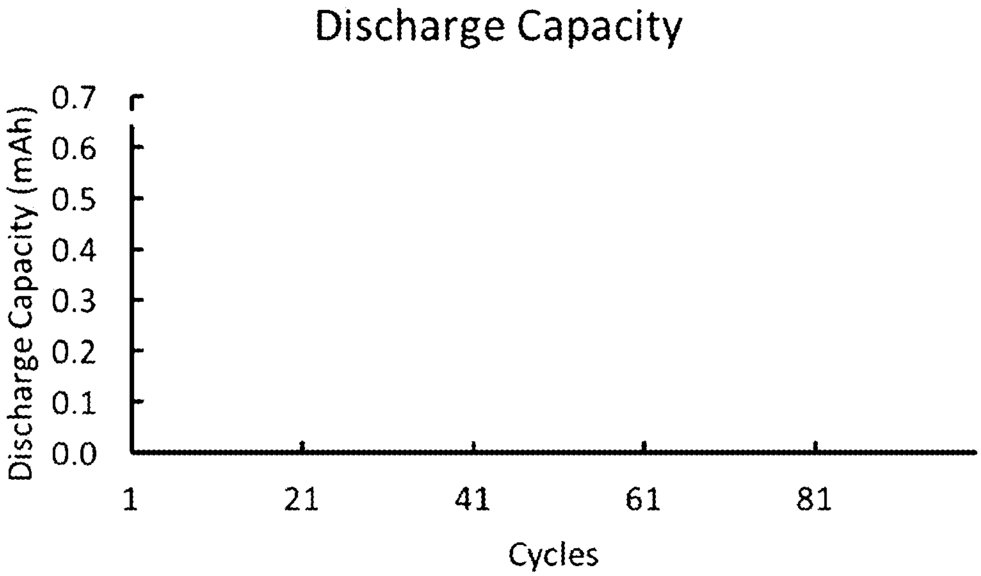
Figure 25C:
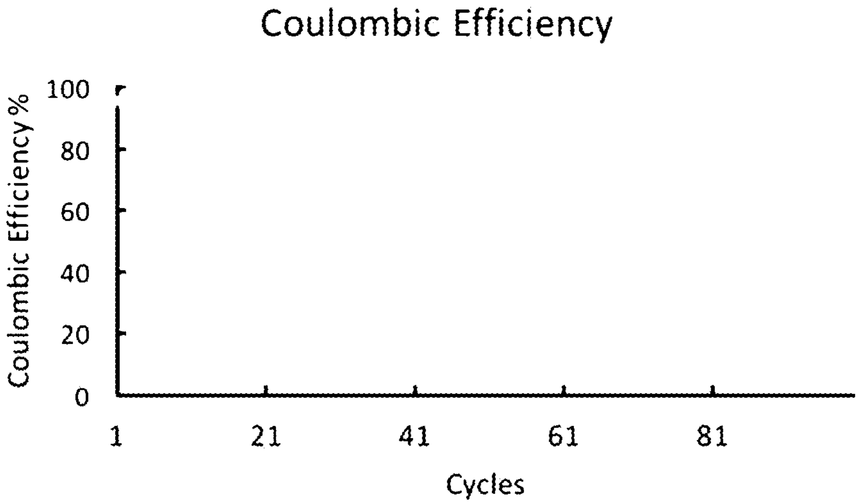
Figure 26:
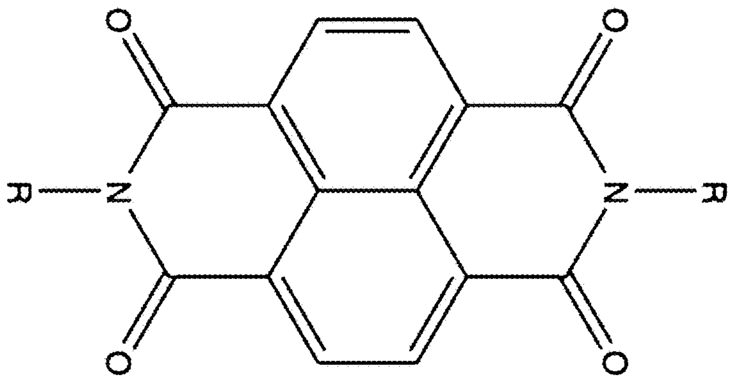
FIG. 26. Molecular structure of napthalene diimide (NDI).
Figure 27A:
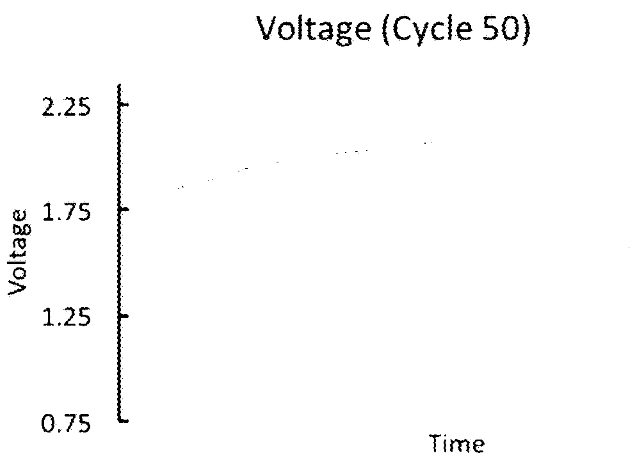
FIGS. 27A-27C. Dimethylpiperidine cyclopropenium was also paired with triethylammonium tail NDI napthalene diimide (NDI) to create an H-cell battery. Voltage (A), discharge capacity (B), and coulombic efficiency (C) were measured.
Figure 27B:
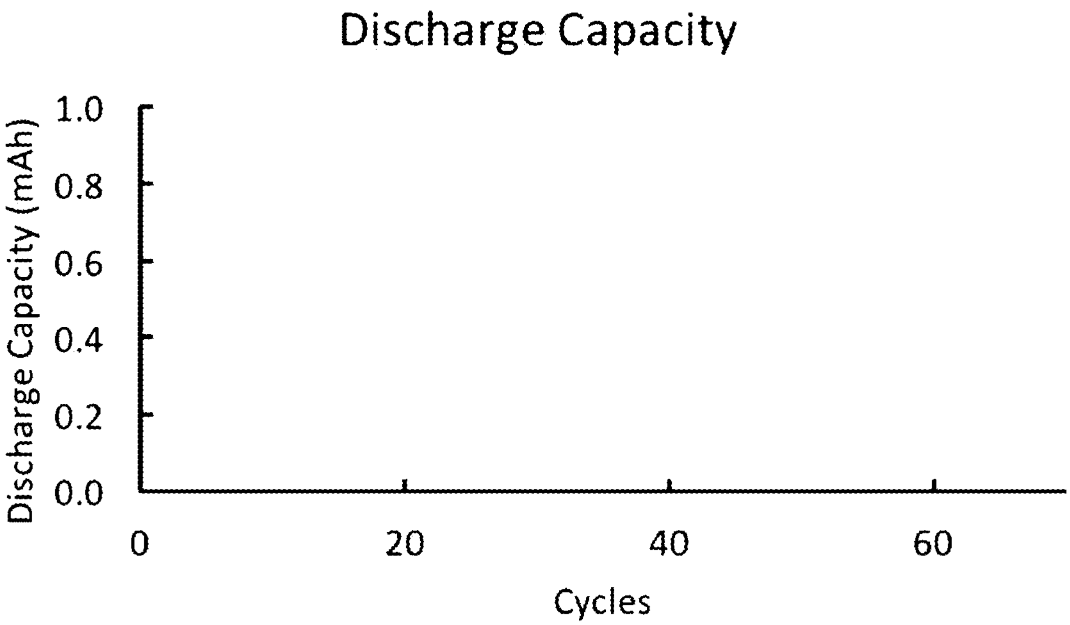
Figure 27C:
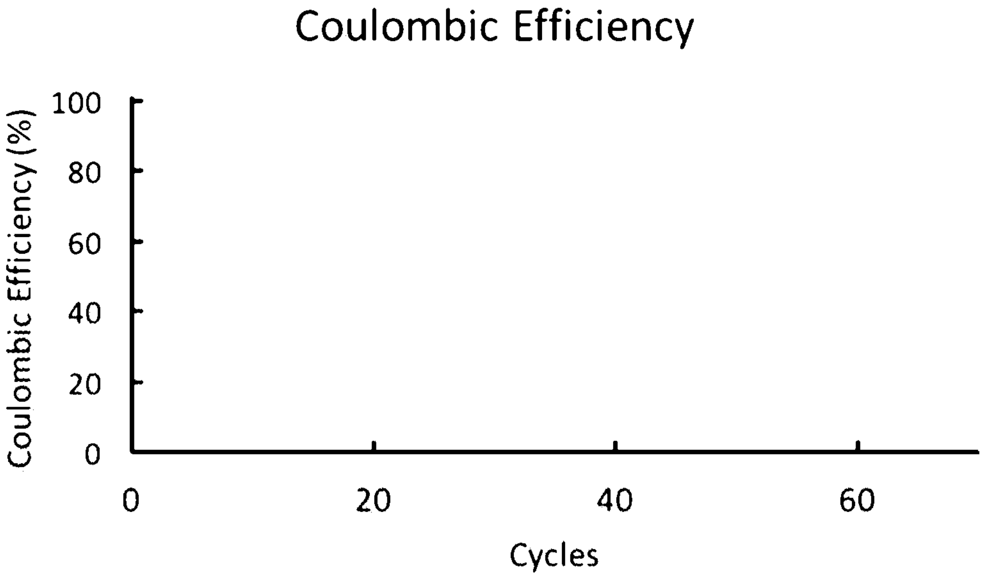
Figure 28A:
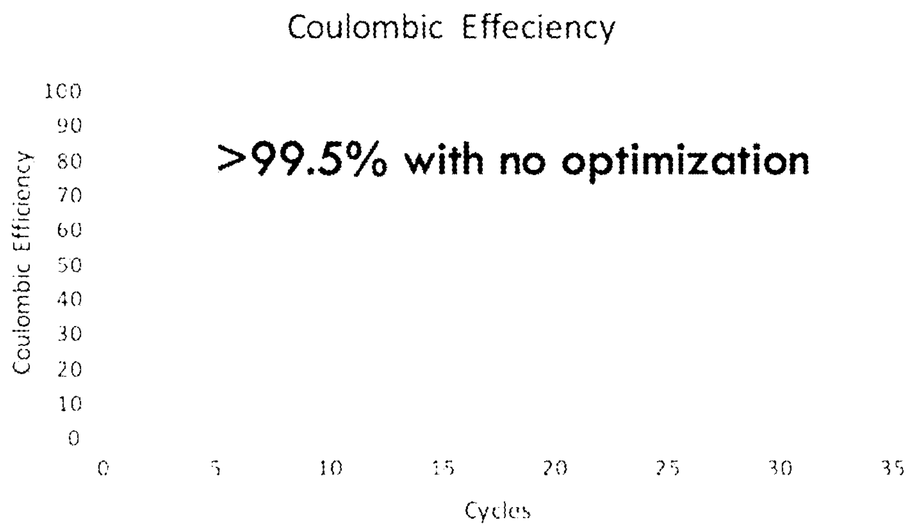
FIGS. 28A-28C. Coulombic efficiency (A) and voltage profile (B) of the battery including the electrolytes in (C).
Figure 28B:
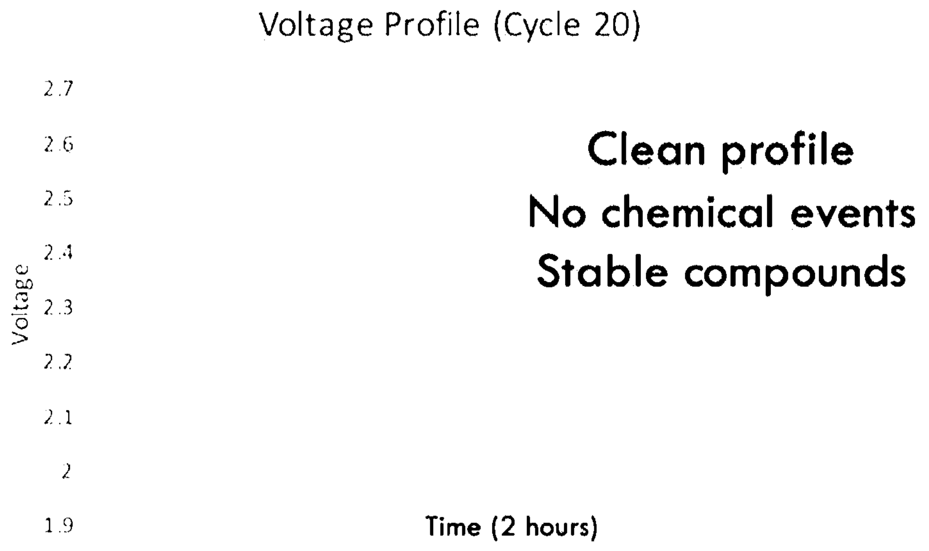
Figure 28C:
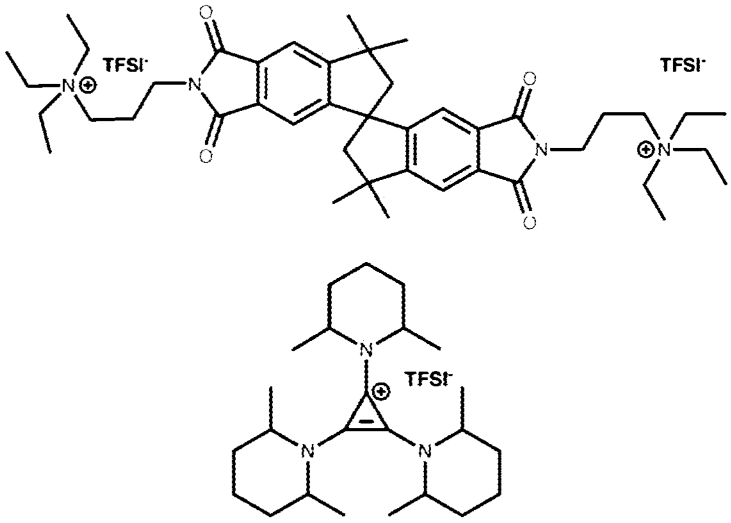

In one embodiment as disclosed herein, dimethylpiperidine cyclopropenium was paired with [PDI][$TFSI]_2$ to create an H-cell battery. The battery used acetonitrile as solvent, and LiTFSI as supporting electrolyte. The battery showed a coulombic efficiency of 99.63% and capacity retention of 99.59% (FIGS. 25A-25C). In another embodiment as disclosed herein, dimethylpiperidine cyclopropenium was paired with triethylammonium tail napthalene diimide (NDI) to create an H-cell battery. The molecular structure of NDI was shown in FIG. 26. The battery used acetonitrile as solvent, and LiTFSI as supporting electrolyte. The battery showed a coulombic efficiency of 99.5% and capacity retention of 99.6% (FIGS. 27A-27C). In yet another embodiment as disclosed herein, dimethylpiperidine cyclopropenium was paired with a spiro-fused compound as shown in FIG. 28C. LiTFSI was used as supporting electrolyte, and the membrane was statistically on week timescale. After one-hour charge, voltage cutoff discharge was measured. The OCV was 2.4V and would be higher if fully charged. Coulombic efficiency and voltage profile were shown in FIGS. 28A-28B.

Figure 29:
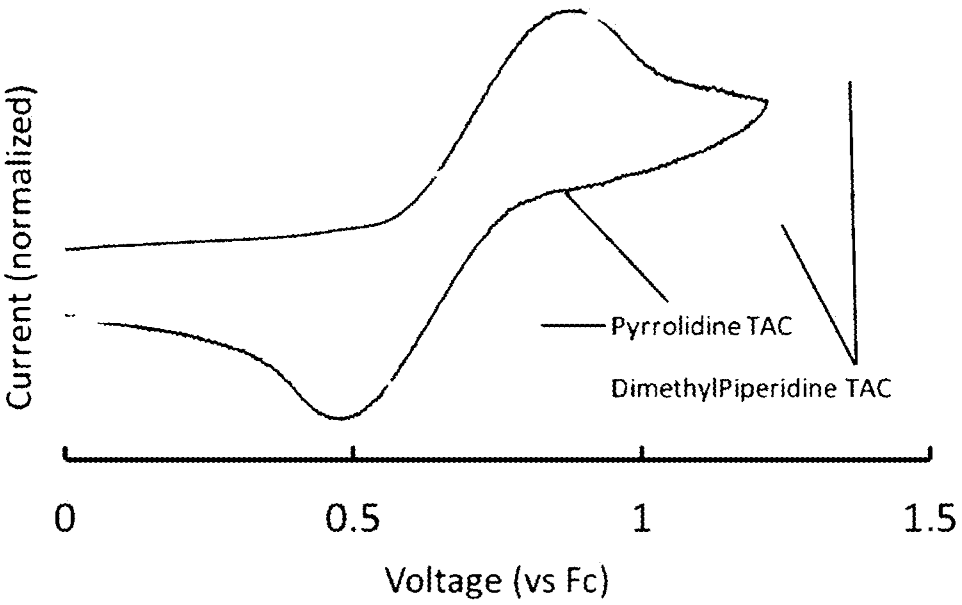
FIG. 29. Voltage profile of different cyclopropeniums.
Figure 30:
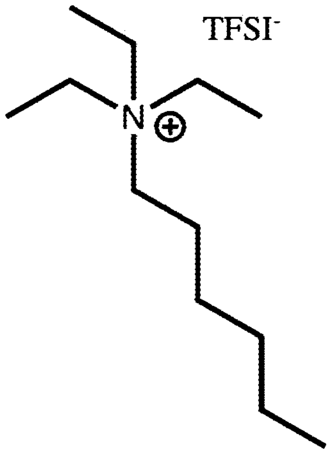
FIG. 30. Ionic liquids to be used instead of solvent to achieve high energy density flow batteries.
Figure 30:
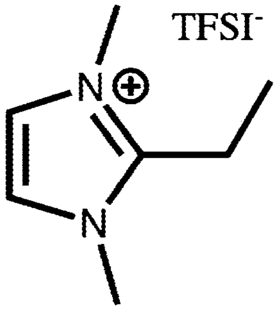

In certain embodiments, the batteries disclosed herein can be created with ionic liquid as solvents (e.g., FIG. 29), and various cyclopropeniums with different voltages (e.g., pyrrolidine TAC as shown in FIG. 30).

Figure 31:
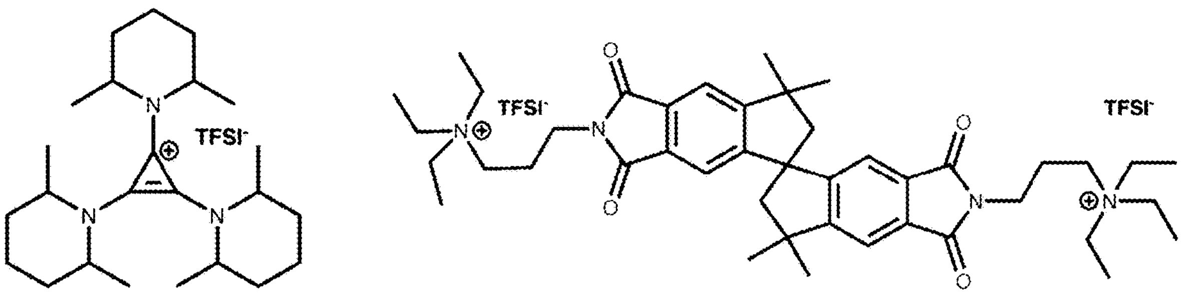
FIG. 31. Molecular structures of electrolytes used in a high voltage battery.
Figure 32:
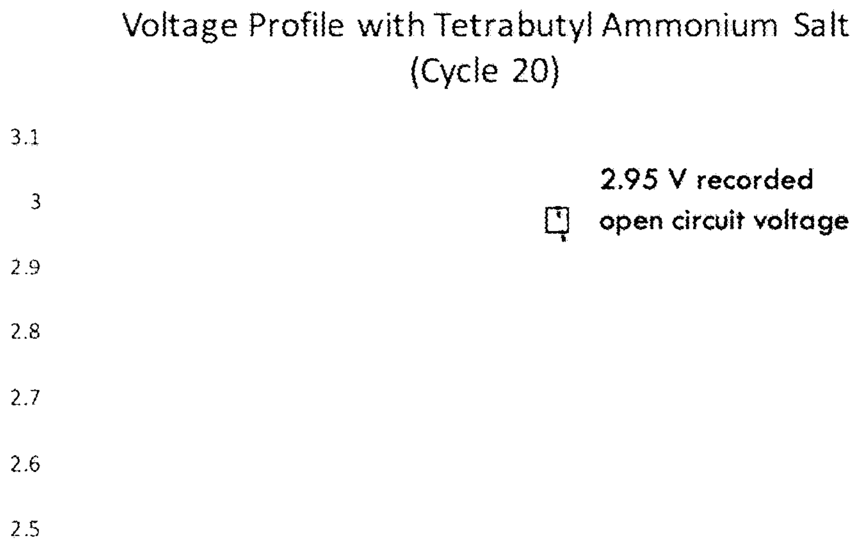
FIG. 32. Voltage profile with tetrabutyl ammonium salt.

In certain embodiments, voltages can be manipulated with salt using ionic liquid. Voltages can be changed by manipulating the counter-ions. In one embodiment, battery was created using the electrolytes as shown in FIG. 31. Open circuit voltage after charging for this battery was 2.95 V (FIG. 32).

The membrane used in the example batteries, was in accordance with the disclosure of U.S. Provisional Application No. 62/699,489.

EXAMPLES

The presently disclosed subject matter will be better understood by reference to the following examples, which are provided as exemplary of the presently disclosed subject matter, and not by way of limitation.

Example 1: Materials Platforms for Flow Batteries with High Coulombic Efficiency and Stable Cycling The present example described a working battery included of all organic electrolytes dissolved in organic media that had best in class stability. The redox molecules had a solubility over 1 mol electrons/liter, and a cell with 0.4 M electron concentration was demonstrated with steady performance >450 cycles (>74 days). The average coulombic efficiency during cycling was >99.95% at 1 C rate (1.6 mA/cm2), while the capacity retention was highly stable (99.954% per cycle). This cell showed stability suitable for a long lifetime non-aqueous redox flow battery. For the membrane, the present example employed a low-cost size exclusion cellulose membrane that allowed the utilization of a dendrimer strategy to avoid active material crossover. The present example showed that this cellulose-based membrane can support high voltages in excess of 3 V and extreme temperatures (−20 to 110° C.). Such large voltage excursions and high temperature ranges were not achievable with known aqueous systems. Thus, the voltage of this stable system allows modification of the molecules for use in an aqueous flow battery. Moreover, the molecular platforms for these electrolytes can be readily tuned through derivatization Organic media can be preferable to aqueous media in certain applications due at least in part to the higher energy and power density accessed through the larger electrochemical window, thus shrinking the footprint of flow batteries. This benefit has been showcased in high voltage hybrid batteries that utilize lithium metal or intercalated lithium graphite electrodes coupled to a flow half-cell. However, in certain of these systems, the power and capacity are not fully decoupled. An advantage of aqueous media is the low cost for non-space limited applications.

The present example addressed an opportunity for RFBs by designing and creating stable organic compounds that are easily tuned through derivatization. The present example provided the first example of a highly stable working battery with both electrolytes fully dissolved in organic media, though their voltage does not preclude their use in water. The present example described two new redox pairs soluble in organic solvent, one for the negative electrode of the battery based on a derivative of perylene diimide (PDI) ($[PDI][TFSI]_2$) and another for the positive electrode based on a ferrocene derivative ($[Fc_4]$; FIG. 6B).

The ferrocene derivative showcased the viability of using a dendrimer-like strategy to prevent membrane crossover, and the $[PDI][TFSI]_2$ had a solubilizing TEG (TEG=(CH2CH2O)3CH3) chain that highlights the ease of synthetic manipulability in this class of electrolytes. The solubility of these molecules is equivalent to >1 mol electron/liter, and steady performance >450 cycles is observed in cells with a concentration of 0.4 mol electron/liter. Although RFBs with lithium at one electrode have utilized molecules with higher energy densities, 0.4 M is among the highest concentrations reported in redox flow batteries with two organic electrolytes dissolved in organic media. The organic electrolytes created for this example were not only highly soluble and electrochemically stable, and they can be synthetically modified to tune their electrochemical properties to achieve higher voltages. The present example also demonstrated that the cellulose-based membrane can support high voltages (>3 V) in an organic redox flow battery and can operate at varying temperatures (−20 to 110° C.).

For a redox flow cell, the membrane and the active molecules can be developed in concert to achieve desired ion crossover and membrane degradation for RFBs. Furthermore, a potential membrane for organic media must be inexpensive and able to reliably prevent crossover of the active components at a variety of voltages and temperatures. The present example found that a dialysis, size exclusion membrane made from cellulose was suitable for such applications. To partner with this membrane, the present example synthesized $[PDI][TFSI]_2$ and dendrimer-like tetraferrocene species $[Fc_4]$ (FIG. 6B) as the active component for the negative and positive half cells, respectively. Their syntheses and characterization are further discussed in connection with FIGS. 2 and 3.

They have large hydrodynamic radii to preclude their ability to transverse the dialysis membrane. A similar strategy has been employed for polymers and oligomers. Perylene diimide is a suitable platform as an anolyte molecule due to its accessible 2-electron reduced state, electrochemical stability, and its straightforward derivatization. As a case in point, $[PDI][TFSI]_2$ was synthesized as a double tetra-alkyl ammonium salt with a glycol chain, showcasing the ease of derivatization to achieve higher solubility. This synthetic tunability provided access to a concentration of 1 M electron in acetonitrile, which corresponded to a theoretical capacity of 26.8 $AhL^{-1}$. Likewise, ferrocene, has a well-known oxidation-reduction couple and is easily derivatized. $[Fc_4]$ is a viscous oil, which in diglyme afforded a maximum concentration of 2 M (8 M electron due to four subunits) electron representing a theoretical capacity of 214.4 $AhL^{-1}$. Solubility and hydrodynamic radius are improved to achieve maximum power density while limiting membrane crossover.

FIG. 7A showed the cyclic voltammogram of a solution containing $[PDI]_{2+}$ and $[Fc_4]$. From this data, the standard open circuit voltage was extracted. Mixing these compounds in a 4:1 MeCN:THF (v/v) solvent mixture resulted in the voltammogram displayed. The two closely-spaced electrochemical events situated around −0.7 V vs $Ag^{0/+}$, were known reductions for perylene diimide derivatives (Lee et al, Chem. Soc. 1999, 121, 3513). Due to the small separation of the events, the individual E1/2 of the first and second events could not be determined. $[Fc_4]$ undergoes a four-electron event (one for each ferrocene unit) at ~0.15 V vs $Ag^{0/+}$. Based on these redox events the expected standard cell voltage of a battery made from $[PDI]^{2+}$ and $[Fc_4]$ was ~0.85 V.

With each of the components for a redox flow battery in hand, the present example tested the stability of this system in a static cell (H-cell configuration) employing the dialysis membrane as separator and carbon felt as electrodes. Details for the measurement are discussed below. $[Fc_4]$ and [PDI] $[TFSI]_2$ were dissolved in 10:1 MeCN:diglyme and loaded in approximately a 2:1 $[PDI][TFSI]_2$:$[Fc_4]$ stoichiometry (i.e., the same electron molarity). Lithium hexafluorophosphate was chosen as the supporting electrolyte due to its ability to pass through the membrane, as well as its high conductivity in acetonitrile solutions. In addition, it was observed that LiBF4 and [Et4N][BF4] dissolved in acetonitrile were able to pass through the membrane.

The cell was operated at a constant current of 1 C (1.6 $mA/cm^2$) and cycle repeatedly between charge and discharge while stirring each solution (FIGS. 7B and 6-7). Low concentrations were chosen to facilitate a one-hour charge/discharge cycle. This gives a low energy density of around 50 mWh/L for these cells. Higher energy densities will be pursued with second generation higher voltage compounds. At this 1 C current, the cell reached a 92% state of charge, which is well above the 80% to show cycling stability.

An indicator of stability is the capacity retention over time. FIG. 7B showed the capacity retention for the charge and discharge process over 50 cycles. Linearly fitting this data obtained a slope representing a fade of 0.0453% per cycle for the discharge capacity. FIG. 7D showed the capacity retention for the charge and discharge process over more than 200 cycles. After an initial small decrease in capacity, the charge and discharge capacity settled after cycle 40. Linearly fitting this data from 40 to 235, a slope was obtained representing a fade of 0.00614% per cycle for the discharge capacity.

To test for decomposition of the charged active molecules, a cell was stopped in its charged state for 11 days, after which cycling was resumed. The charged molecules, $[PDI]^{\circ 0}$ and $[Fc_4]^{4+}$, remained unaffected as the full capacity stored (diamond shape pointed out by arrow in FIG. 7D) was able to be discharged. Remarkably, resuming cycling for 30 more charge/discharge cycles, no capacity loss was observed (FIG. 7D). All told, the radicals formed upon charging the cell were so stable that no decomposition was observed after this cell resided for more than 500 h at 50% or more state of charge.

This stability is unprecedented for a redox flow battery utilizing electrolytes dissolved in organic media. From the charge and discharge capacity at each cycle, the present example calculated the coulombic efficiency (CE). CE=(discharge capacity/charge capacity)*100%. The CE is also plotted in FIGS. 7B and 7D and displays an average of 99.954% and 99.955% respectively. This CE value is also remarkable for a re-dox flow battery with electrolytes dissolved in organic media and approaches optimized aqueous systems.

The open circuit voltage of the cell at different states of charge (SOC) was measured, and found a monotonic increase from ~0.63 to ~0.82 V from 10 to 90% SOC, respectively, as shown in FIG. 7B inset. Healthy charge and discharge profiles—another indicator of stability, were observed (FIGS. 7B and 7D inserts). In fact, there is a small shift during the first 40 cycles where the initial capacity of ~-87% SOC settles to ~81% SOC at around cycle 40. (FIG. 7C). Taken together, this represents a highly stable solution state battery in organic media.

One criteria for new organic electrolytes is their stability when charged at high concentration. To address this, high concentration cells were tested by assembling pouch cells. FIG. 7E showed cycling of a battery built with 0.4 M electron equivalents (0.1 M $[Fc_4]$ and 0.2 M $[PDI][TFSI]_2$). This high concentration rivaled state-of-the-art organic media RFBs while displaying long-term cycling stability. It had an average CE above cycle 5 of 99.868%. An initial induction period of around 20 cycles was observed due to the insolubility of neutral $[Fc_4]$ in acetonitrile. This led to a slow rise in capacity due to the time for $[Fc_4]$ to fully penetrate the electrode, as charged $[Fc_4]$ was soluble in acetonitrile. After this induction period, the cell settled at a constant charge/discharge capacity corresponding to ~81% SOC, akin to the low concentration cell (FIG. 7D inset). The charge/discharge profiles of the low and high concentration cells had slightly different shapes due to stirring in the low concentration cell, which led to low diffusion impedance and a sharp approach toward the cutoff voltages. Once leveled, the energy efficiency of this high concentration cell was ~68% measured at cycle 200. Taken together, this cell demonstrated the stability of the compounds at relevant battery operating conditions.

The present example tested whether the membrane is amenable to large temperature excursions and to higher-voltage second generation compounds. The membrane was exposed to high (110° C.) and low (−20° C.) temperatures, as well as to strong reducing and oxidizing conditions, after which, dialysis was performed. Details are disclosed below. For example, the membrane was soaked in a solution of sodium naphthalenide (approximately −3.0 V vs $Fc^{0/+}$) and subsequently assembled an H-cell with this membrane. One chamber of the H-cell was filled with $[PDI][TFSI]_2$ in acetonitrile (FIG. 1), while the other contained pure acetonitrile. $[PDI][TFSI]_2$ was used for crossover experiments due to its smaller sized and strong absorption. After stirring overnight, no detectable crossover of the $[PDI][TFSI]_2$ was visibly observed (FIG. 9A). Strongly oxidizing ($NOBF_4$, c.a. 0.9 V vs $Fc^{0/+}$) conditions yielded similar results but with a slight fluorescence from crossover of the $[PDI][TFSI]_2$ (FIG. 9B). It was also found that the membrane was stable at high (110° C.) and low (−20° C.) temperatures (FIGS. 11, 12A-12E). Moreover, typical aqueous cells would not be operable at these extreme temperatures.

The present example next quantitatively assessed the impact of these treatments on the membrane's performance under battery operating conditions. Cycling showed stable cycling for all conditions tested except for the membrane treated with $NOBF_4$, which showed a small monotonic fade presumably due to crossover of the active electrolytes (FIGS. 9C-9D). To quantify the amount of crossover, UV-Vis spectra of the $[Fc_4]$ chamber was taken. From the molar absorptivity of the strong chromophore $[PDI][TFSI]_2$ (Emax=76,341 $M^{-1}$ $cm^{-1}$), the present example found a crossover of <0.05% for the reducing, hot, and cold conditions, while the oxidizing nitrosonium condition gave a crossover of 1.25% (see Methods section). Additionally, the low concentration cell above (FIG. 7D) was dismantled after cycling and checked for crossover. UV-vis spectroscopy showed that 0.2% of the $[PDI][TFSI]_2$ crossed over during the >30 days and >250 cycles, indicating that crossover is negligible. The key finding is that the cellulose based membrane is effective in organic solvents over long periods of time, stable to a >3 V voltage window, and stable to temperatures outside the range available for aqueous systems.

The present example disclosed a highly stable battery utilizing electrolytes dissolved in organic media. This battery showed improved capacity retention of 99.994% per cycle. This system also showed improved coulombic efficiency of 99.955% which was comparable with aqueous systems that have been heavily optimized over years of example. The voltage of these examples can be suitable for use in water with simple solubilizing modifications. The present example also disclosed a new organic electrolyte platform to the flow battery field based on perylene diimide cores. This family of compounds is electrochemically stable, and highly modifiable for both solubility and voltage. This system can be used for larger cell voltages. The membrane chosen for this cell was shown to withstand the conditions suitable for higher voltages (>3 V) and wider temperature fluctuations outside the range of aqueous systems.

Materials. All chemicals were purchased from commercial sources and used without further purification unless otherwise specified. Specifically, lithium hexafluorophosphate ($LiPF_6$) packed under argon was purchased from Alfa Aesar and brought into a glovebox directly. Anhydrous solvents were purchased from Sigma-Aldrich (Sure Seal™) and brought directly into a glovebox to store over 4 Å sieves.

5 mL H-Cell glassware was purchased from Adams and Chittenden (part #952752). Teflon gaskets were cut from sheet Teflon (0.81 mm thick, Alfa Aesar) used in replacement of the viton gaskets provided. Sigracell carbon fiber electrodes (GFD4) were used for all battery testing. Membranes were purchased from SpectrumLabs (3.5 kD, Regenerated Cellulose, flat sheet).

Synthesis: All reactions were performed in oven-dried or flame-dried round bottom flasks, unless otherwise noted. The flasks were fitted with rubber septa and reactions were conducted under a positive pressure of nitrogen, unless otherwise noted. Anhydrous and anaerobic solvents were obtained from a Schlenk manifold with purification columns packed with activated alumina and supported copper catalyst (Glass Contour, Irvine, CA). Automated flash chromatography was performed using a Teledyne Isco Combiflash Rf200 and Redisep Rf Gold Silica columns. The final electrolyte compounds were brought into a glovebox after evacuation in the antechamber overnight, at which point they were dried on 4 Å sieves in dry solvent overnight, subsequently filtered, and evaporated to dryness for further use.

Instrumentation. $^1H$, and $^{13}C$ NMR spectra were recorded on a Bruker DRX300 (300 MHz), Bruker DRX400 (400 MHz) or a Bruker DMX500 (500 MHz) spectrometer. Chemical shifts for protons were reported in parts per million downfield from tetramethylsilane and are referenced to residual proton in the NMR solvent ($CHCl_3$: δ 7.26; DMSO: δ 2.50; $CD_3CN$: δ 1.94). Chemical shifts for carbon were reported in parts per million downfield from tetramethylsilane and were referenced to the carbon resonances of the solvent ($CDCl_3$: δ 77.0, $CD_3CN$: 118.26). Data were represented as follows: chemical shift, multiplicity (s=singlet, d=doublet, t=triplet, m=multiplet), coupling constants in hertz, and integration. The mass spectroscopic data were obtained at the Columbia University Mass Spectrometry facility using a Waters XEVO G2-XS QToF equipped with and ASAP probe or a JEOL JMSHX110A/110A tandem mass spectrometer. Absorption spectra were obtained on a Shimadzu UV 1800 UV-Vis spectrophotometer.

Cyclic voltammograms (CVs) were recorded on a CHI600C electrochemical workstation using a three-electrode setup. Glassy carbon, platinum and $Ag/AgNO_3$ were employed as the working, counter and reference electrode, respectively. All battery cycling was conducted using either a CHI760D galvanostat or a Keithley 2400 controlled through National Instruments LabVIEW software running a custom script programed.

H-cell assembly. The H-cell used was placed on a stirplate and the compartments were both stirred via magnetic stirbars. The membrane was pretreated outside the box by soaking for 30 minutes in deionized water, before being transferred to solvent and sparging overnight and subsequently brought into the glovebox. The membrane was then transferred into fresh solvent and stored over 4 Å molecular sieves for at least 24 h. The membrane was tightly clamped between Teflon gaskets in the H-cell. Impedance measurements were recorded occasionally in the presence of supporting electrolyte (0.5 M) but in the absence of the active compounds. The total resistance was observed to be 170±4Ω. Considering that most of the resistance contribution to the total resistance comes from the membrane, the area-specific resistance (ASR) comes to ~865 Ω/cm2.

Pouch cell assembly. Cells were assembled at 0.1 M $[Fc_4]$ and 0.2 M $[PDI][TFSI]_2$. Both cell compartments were prepared in the same manner: 10 μL of the catholyte or anolyte solution (at their respective concentrations) were dropped onto carbon paper. These carbon electrodes were placed on a stainless-steel spacer, which functioned as mechanical support and electrical contact. Finally, these were assembled with the membrane and sealed in polybags (Sigma Aldrich).

Synthesis and Characterization:

1-(6-Bromohexanoyl)ferrocene (S1): The molecular structure of S1 is shown below

S1

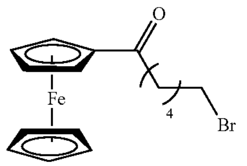

A modified procedure based on Vulugundam *Org. Biomol. Chem.* 2015 was performed. An oven-dried, 1 L three-neck round bottom flask was charged with ferrocene (10 g, 53.8 mmol, 1 eq) and $AlCl_3$ (7.9 g, 59.2 mmol, 1.1 eq). The flask was evacuated and back-filled with nitrogen. $CH_2Cl_2$ (500 ml) was transferred into the flask via cannula. An adapter fitted with tygon tubing was attached to one neck under nitrogen and the tubing immersed in a saturated solution of $NaHCO_3$. 6-Bromohexanoyl chloride (6.6 ml, 43 mmol, 0.8 eq) was added over 5 min. The reaction mixture became dark purple. It was allowed to stir overnight, after which it was judged complete by TLC (4:1 hexane:EtOAc), added to brine (500 ml), and the organic layer was extracted. The aqueous layer was extracted with CH2Cl2 (2×250 ml). The organic layers were combined and washed with brine (500 ml), dried with $MgSO_4$, filtered, and the solvent removed with a rotary evaporator. Purification by column chromatography ($SiO_2$, hexanes:EtOAc going from 100:0 to 20:80) afforded a brown oil (16.8 g, 46 mmol, 100%). All spectroscopic data matched those previously reported.

1-(6-Bromohexyl)ferrocene (S2): The molecular structure of S2 is shown below:

S2

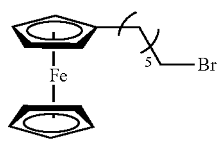

A modified procedure based on Vulugundam *Org. Biomol. Chem.* 2015 was performed. An oven-dried, 500 ml Schlenck flask was charged with $NaBH_4$ and $AlCl_3$. The flask was evacuated and back-filled with nitrogen. THE (400 ml) was added to the flask via cannula. The flask was immersed in an ice bath and allowed to cool 15 min. 1-(6-Bromohexanoyl)ferrocene (16.8 g, 46 mmol, 1 eq) was added over 10 min. The dark orange solution lightened over several hours. The reaction was monitored by TLC (9:1 hexanes:EtOAc) and judged complete after 6 hours. The reaction mixture was poured into $H_2O$ (400 ml). Following the quench, the mixture was poured into a separatory funnel and the aqueous layer was extracted with $CH_2Cl_2$ until clear. The organic layer was dried with $Na_2SO_4$, decanted, and the solvent removed with a rotary evaporator. Purification by column chromatography ($SiO_2$, hexanes:$CH_2Cl_2$ going from 100:0 to 50:50) afforded a brown oil (12.1 g, 35 mmol, 75%). All spectroscopic data matched those previously reported.

[$Fc_4$]: The synthesis scheme is shown in FIG. 2. An oven-dried, 250 ml Schlenck flask was charged with NaH (2.55 g, 64 mmol, 20 eq). The flask was evacuated and back-filled with nitrogen three times. DMF (45 ml) was added and the reaction mixture was cooled for 15 min in an ice water bath. Pentaerythritol (0.435 g, 3.18 mmol, 1 eq) dissolved in dry DMF (60 ml) was added to the NaH via syringe over 8 min. The Schlenck flask was removed from the ice bath after 40 min and allowed to stir at room temperature for one hour. 1-(6-Bromohexyl)ferrocene S2 (5.56 g, 15.9 mmol, 5 eq) dissolved in dry DMF (20 ml) was added over 15 min. The reaction mixture was allowed to stir overnight, at which point TLC (95:5 hexanes:EtOAc) showed consumption of starting material. Methanol was added until the reaction mixture was quenched. EtOAc (500 ml) was added and the organic layer was extracted with 5% LiCl (6×125 ml). The organic layer was dried with $Na_2SO_4$, decanted, and the solvent removed with a rotary evaporator. Purification by column chromatography ($SiO_2$, hexanes: EtOAc going from 100:0 to 20:80) afforded a brown oil (2.55 g, 21 mmol, 66%). (500 MHz, $CDCl_3$, 300K): δ 4.10 (s, 20H), 4.06 (d, 6.95 Hz, 8H), 4.06 (d, 6.95 Hz, 8H), 3.39-3.36 (m, overlap, 16H), 2.31 (t, 7.72 Hz, 8H), 1.54 (m, overlap, 16H), 1.34 (m, overlap, 16H). $^{13}C$ NMR (125 MHz, $CDCl_3$, 300K): 89.48, 71.40, 69.70, 68.47, 68.05, 67.01, 45.35, 31.12, 29.58, 29.52, 29.46, 26.07 (FIG. 4). IR (ATR) [$cm^{-1}$] 3092.67, 2928.11, 2855.20, 1711.98, 1635.79, 1463.65, 1275.14, 1267.64, 1261.43, 1104.96, 1000.09, 816.06, 764.37, 758.51, 749.60. HRMS ($APCI^+$) m/z ($M^{30}$) calculated for $C_{69}H_{92}Fe_4O_4$=1208.4402; found 1208.4415.

[PDI][TFSI]$_2$: The synthesis scheme is shown in FIG. 3. A dry round bottom flask (150 mL) was charged with a stirbar, followed by literature known S3 (2.99 g, 5.62 mmol, 1 eq.) (Biedermann, *Angew. Chem. Int. Ed.* 2012, 51, 7739). The flask was evacuated and backfilled with $N_2$, at which point dry propylene carbonate was introduced via syringe (60 mL). Next, literature known 1-iodo-triethyleneglycol monomethyl ether (Dobbelin, *Chem. Mater.* 2012, 24, 1583) (14.9 g, 5.43 mmol, 9.7 eq.) was introduced via syringe and the reaction mixture was stirred at 145° C. for 17 hours. The reaction mixture was cooled to room temperature, at which point ethyl acetate (400 ml) was introduced to precipitate the product. The solid salt $S_4$ was filtered, re-dissolved in acetonitrile (250 ml), and crashed out with more ethyl acetate (900 ml). This was performed once again to ensure that all propylene carbonate was removed, and acetonitrile was removed under reduced pressure to yield 5.6 g (92%) of dark red solid, which was used for the subsequent chloride ion exchange without further purification.

A round bottom flask (100 mL) was charged with a stirbar, $S_4$ (0.204 g, 0.189 mmol), and methanol (50 mL). Amberlite IRA402 chloride form (1.27 g) was added and the reaction mixture was allowed to stir for 24 hours, after which the reaction mixture was initially filtered through a fluted filter paper. Once filtered of the bulk Amberlite, the solution was filtered through a 0.45-micron syringe filter to remove any trace Amberlite and subsequently dried on a rotary evaporator. This product, S5, was used without further purification (0.176 g, quant.)

To achieve the target [PDI][TFSI]$_2$, a round bottom flask (25 mL) was charged with a stirbar, S5 (0.232 g, 0.384 mmol, 1 eq.), $CH_2Cl_2$ (14 mL), and deionized water (8 mL). Once dissolved, lithium bis(trifluoromethanesulfonyl)imide (0.308 g, 1.07 mmol, 2.8 eq.) was added and the reaction mixture was stirred for 20 hours. After stirring, the organic and aqueous layers were separated, and the organic layer was subsequently washed with deionized water until the aqueous wash showed no precipitate when exposed to $AgNO_3$. Once washing was complete, the organic layer was evaporated using a rotary evaporator to yield the target compound [PDI][TFSI]$_2$ as a solid (0.287 g, 54%). Due to the dynamics of the TEG chain in the presence of salt along with the electrostatics of the tetra-alkyl ammonium and TFSI salts, NMRs at room temperature were affected by concentration, solvent, temperature, and counterion. To coalesce the $^1H$ spectrum, DMSO at 420K was used, while $LiPF_6$ saturated $CD_3CN$ at 345K was used for the $^{13}C$ spectrum. (500 MHz, DMSO, 420K): δ 8.97 (broad doublet, J=7.7 Hz, 4H), 8.70 (d, J=8.70 Hz, 4H), 4.62 (dd, J=6.65 Hz, J=6.65 Hz, 4H), 4.01 (broad, 4H), 3.83 (dd, J=6.65 Hz, J=6.65 Hz, 4H), 3.76 (dd, J=4.69 Hz, J=4.69 Hz, 4H), 3.67 (overlap, 4H), 3.63 (overlap, 4H), 3.58 (overlap, 4H), 3.48 (dd, J=4.69 Hz, J=4.69 Hz, 4H), 3.28 (s, 6H), 2.73 (s, 12H). $^{13}C$ NMR (125 MHz, CD3CN saturated with LiPF6, 345K): δ 6 163.93, 134.59, 131.89, 129.03, 125.74, 124.54, 122.92, 122.54, 119.99, 72.67, 71.44, 71.01, 65.58, 63.72, 59.24, 53.34, 35.22, 1.67, 1.51, 1.34, 1.18, 1.01, 0.85, 0.68 (FIG. 5). IR (ATR) [$cm^{-1}$] 3430.1, 3056.0, 2986.4, 2926.3, 2880.8, 1696.55, 1180.31, 809.96, 612.7. HRMS ($ESI^+$) m/z ($M^{2+}$) calculated for $C_{46}H_{58}N_4O_{10}$=413.2076; found 413.2089.

Electrochemical Procedures for Long-Term Cycling Stability

The long-term stability battery cycling was explored using 0.5 M LiPF6 (FIGS. 14A-14B) or 0.5 M LiTFSI (FIG. 7D) as the charge balancing salts. The long-term stability battery cycling was conducted in a glovebox at a concentration of 2.42 mM [PDI][TFSI]2 and 1.14 mM [$Fc_4$] in a mixture of acetonitrile/diglyme (10:1) with 0.5 M $LiPF_6$ as the charge balancing salt. The H-cell used was placed on a stirplate and the compartments were both stirred via magnetic stirbars. The membrane was pretreated outside the box by soaking for 30 minutes in deionized water, before being transferred to solvent and sparging overnight and subsequently brought into the glovebox. The membrane was then transferred into fresh solvent and stored over 4 Å molecular sieves.

FIG. 15 showed cell open circuit voltage (OCV) at different states of charge for the battery $[PDI]^0|[PDI]^{2+}||[Fc_4]^{4+}|[Fc_4]^0$ (2.42 mM/1.14 mM) using 0.5 M LiPF6 as supporting electrolyte. FIG. 16 showed selected charge and discharge profiles for the low concentration cell assembled using 1.8 mM $[Fc_4]$ and 1.17 mM $[PDI][TFSI]_2$. 0.5 M Li[TFSI] was used as supporting electrolyte. Identical data as that shown in FIG. 7D inset. FIG. 17 showed Selected charge and discharge profiles for the high concentration cell assembled using 0.1 M $[Fc_4]$ and 0.2 M $[PDI][TFSI]_2$. 0.5 M Li[TFSI] was used as supporting electrolyte. Identical data as that shown in FIG. 7E inset.

Current Density

The performance of the system at different current densities was investigated. The H-cell was assembled following the same procedure as for the long-term cycling setup with the same concentration of $[PDI][TFSI]_2$ and $[Fc_4]$. After being allowed to settle in at a 1 C current (1.7 $mA/cm^2$), the current density was dropped to 0.3 C (0.5 $mA/cm^2$) and increased in a stepwise manner to the values shown in FIGS. 8A-8B.

General Procedure for Membrane Stability:

The membranes were soaked in water for 1 h before treatment. For high temperature, the membrane was rinsed with propylene carbonate, placed in propylene carbonate and heated to 110° C. overnight in a vial. For low temperature, the membrane was rinsed with acetonitrile and placed in acetonitrile in a vial in a −20° C. freezer overnight. For oxidizing conditions, the membrane was rinsed with acetonitrile and stirred in nitrosonium tetrafluoroborate ($NOBF_4$, 0.1 M in acetonitrile) for 4 h. For reducing conditions, the membrane was rinsed with anhydrous diglyme, placed in anhydrous diglyme, and sparged for 3 h before being brought into a glove box. It was rinsed in a fresh solution of diglyme before being added to a solution of sodium naphthalenide (0.1 M in diglyme) in a glove box for 1 h. The sodium naphthalenide was a persistent dark green the entire time indicating no quenching of the reagent. A control where the membrane was only soaked in water and rinsed with acetonitrile was also performed.

Following these conditions, $[PDI][TFSI]_2$ (20 mg) and $LiPF_6$ (60 mg) in acetonitrile were added to one side of the H-cell. Fluorine NMR was taken after 15 h and showed crossover of the salt for all conditions. The blank side was colorless for all conditions except nitrosonium tetrafluoroborate, where a minimal amount of fluorescence could be seen. The control H-cell was monitored for crossover for a further 12 days, at which point the absorbance was measured by UV-visible spectroscopy and the amount determined using the molar absorptivity of $[PDI][TFSI]_2$ (0.05% over 12 days, FIGS. 10 and 11).

After these qualitative experiments, membranes treated to the same four conditions as mentioned above were brought into the glovebox in degassed anhydrous solvent and used for cycling experiments with 19 mg $[PDI][TFSI]_2$ and 9 mg $[Fc_4]$ in 0.5 M $LiPF_6$ (FIG. 9C). The cells were run at a 1 C current (0.7 mA) for 12 cycles. At the end of the experiment, the UV-visible spectrum was taken of the $[Fc_4]$ side. The naphthalenide, hot (110° C.), cold (−20° C.), and NOBF4 conditions showed 0.038%, 0.028%, 0.032%, and 1.25% crossover, respectively (FIG. 11).

Crossover of the $[Fc_4]$ molecule in its neutral state was monitored by dissolving 31 mg in THF and putting this solution on one side of an H-cell with the 3.5 kDa membrane with blank THF on the other side (FIG. 13). The absorbance of the blank side was taken after 13 days. Using the molar absorptivity of $[Fc_4]$ (423.67 $M^{-1}$ $cm^{-1}$ at 439 nm), the crossover was found to be 0.60% (FIG. 13). In comparison, unsubstituted monomeric ferrocene diffuses through a 1 kDa membrane overnight.

Example 2: Water Battery Including the Disclosed Compounds had High Coulombic Efficiency and Stable Cycling A water battery was created using compounds disclosed herein. PDI was used as the anolyte, and ferrocene was used as catholyte. The batter included an anion exchange membrane and carbon felt electrodes. Molecular cores and solvent were compatible with cellulose size exclusion membrane. The solvent used for the battery was 0.5 M NaCl in water.

The cycling data showed that the water battery had >99.99% capacity retention, and >99.99% coulombic efficiency (FIGS. 18A-18B).

Example 3: Spiro-Fused Compounds for Use in Organic Batteries

A phthalimide redox molecule fused through a spiro-fused carbon cage was generated for use in an organic battery. The spiro-fused compounds sterically blocked deleterious reactivity in order to stabilize organic radicals for long lifetimes. The use of spiro-fusion to fuse two redox-active organic molecules provided great solubility due to the inability of molecular packing between the compounds.

A battery was created using a highly stable ferrocene oligomer ($Fc_4$) as the catholyte and a spiro-ethylphthalimide as the anolyte in a mixed cell battery, e.g., using commercial Daramic 175 as the separator. The ferrocene oligomer is a catholyte of high stability, and therefore any degradation can be the result of the spiro-ethylphthalide. The battery cells were mixed cells with both compounds in each compartment. The Daramic 175 membrane has 150 nm pores and was washed with solvent and dried. Dimethoxyethane (DME) was used as solvent, and LiTFSI as supporting electrolyte. Six days of cycling revealed no degradation in capacity within the experimental limits of the instrumentation and cell configuration (FIGS. 21 & 22).

No degradation was observed over 1 week of charge (FIG. 23). The state of charge on discharge was ~87%. This showed charging of almost every molecule of spirophthalimide in the anolyte half-cell to what would be the highly reactive radical, which was then stable due to the spiro-fusion sterically blocking deleterious reactions. Additionally, the calendar fade of the molecule was improved over certain previously reported high voltage organic radicals.

Moreover, this motif is general and can be applied to numerous aromatic redox cores. For instance, the spirophthalimide can be derivatized with different solubilizing chains from the imide functionality. Also, an anolyte spiroethylcatechol can be highly stable organic radical with a high voltage.

Although the presently disclosed subject matter and its advantages have been described in detail, it should be understood that various changes, substitutions and alterations can be made herein without departing from the spirit and scope of the disclosed subject matter. Moreover, the scope of the present application is not intended to be limited to the particular embodiments described in the specification. Accordingly, the appended claims are intended to include within their scope such processes, machines, manufacture, compositions of matter, means, methods, or steps.

Various patents, patent applications, publications, product descriptions, protocols, and sequence accession numbers are cited throughout this application, the inventions of which are incorporated herein by reference in their entireties for all purposes.

What is claimed is:

1. An electrolyte solution comprising:

a solvent; and an electrolyte, wherein the electrolyte is soluble in the solvent;

wherein the electrolyte solution is an anolyte solution configured to surround an anode, wherein the electrolyte is a charge storage material comprising an aromatic diimide compound or a derivative thereof, wherein the charge storage material is in a 2-electron reduced state when the anode is fully charged.

2. The electrolyte solution of claim 1, wherein the aromatic diimide compound is a derivative of perylene diimide, a derivative of naphthalene diimide, or a combination thereof.

3. The electrolyte solution of claim 1, wherein the electrolyte is $[PDI][TFSI]_2$.

4. The electrolyte solution of claim 1, wherein the solvent is selected from the group consisting of dimethyl acetamide, diethyl carbonate, dimethyl carbonate, acetonitrile, γ-butyrolactone, propylene carbonate, ethylene carbonate, N-methyl-2-pyrrolidone, fluoroethylene carbonate, N, N-dimethylacetamide, water, salt water, and any mixture or combination thereof.

5. The electrolyte solution of claim 1, wherein the solvent comprises water and a salt, wherein the salt is selected from the group consisting of NaCl, KCl, $MgCl_2$, $CaCl_2$, and LiCl.

6. A redox flow battery comprising:

a cathode cell comprising a catholyte, wherein the catholyte comprises a cyclopropenium compound or a ferrocene derivative; and an anode cell comprising an anolyte, wherein the anolyte comprises the electrolyte solution of claim 1.

7. The redox flow battery of claim 6, wherein the catholyte comprises dimethylpiperidine cyclopropenium.

8. The redox flow battery of claim 6, wherein the anolyte comprises $[PDI][TFSI]_2$, and the catholyte comprises $[Fc_4]$.

9. The redox flow battery of claim 6, further comprising a carbon felt electrode.

10. The redox flow battery of claim 6, further comprising a membrane disposed between the cathode cell and the anode cell.

11. The redox flow battery of claim 10, wherein the membrane is a dialysis and size exclusion membrane.

12. The redox flow battery of claim 10, wherein the membrane is a cellulous membrane.

13. The redox flow battery of claim 6, further comprising a supporting electrolyte.

14. The redox flow battery of claim 13, the supporting electrolyte is LiPF6 or LiTFSI.

15. The redox flow battery of claim 6, wherein the redox flow battery has a coulombic efficiency of about 99% at each cycle for over 500 charge and discharge cycles.

* * * * *